United States Patent
Kim et al.

(10) Patent No.: US 10,785,713 B2
(45) Date of Patent: Sep. 22, 2020

(54) DEVICE AND METHOD FOR ACCESSING MULTIPLE NETWORKS IN WIRELESS COMMUNICATION SYSTEM

(71) Applicant: Samsung Electronics Co., Ltd., Suwon-si, Gyeonggi-do (KR)

(72) Inventors: Jin-Hyoung Kim, Seongnam-si (KR); Chul-Ho Lee, Suwon-si (KR); Jiangwei Xu, Suwon-si (KR); Jin-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 15/509,727

(22) PCT Filed: Sep. 11, 2015

(86) PCT No.: PCT/KR2015/009560
§ 371 (c)(1),
(2) Date: Mar. 8, 2017

(87) PCT Pub. No.: WO2016/039576
PCT Pub. Date: Mar. 17, 2016

(65) Prior Publication Data
US 2017/0265127 A1    Sep. 14, 2017

(30) Foreign Application Priority Data
Sep. 11, 2014 (KR) .................. 10-2014-0120248

(51) Int. Cl.
*H04W 48/18* (2009.01)
*H04W 88/06* (2009.01)
(Continued)

(52) U.S. Cl.
CPC ......... *H04W 48/18* (2013.01); *H04L 43/0888* (2013.01); *H04L 43/16* (2013.01);
(Continued)

(58) Field of Classification Search
CPC . H04W 48/18; H04W 24/08; H04W 28/0268; H04W 88/06; H04W 84/12; H04L 43/0888; H04L 43/16
(Continued)

(56) References Cited

U.S. PATENT DOCUMENTS 6,999,420 B1 * 2/2006 Chiu ................ H04L 47/10
370/231
2005/0108427 A1 * 5/2005 Datta ................ H04L 29/06
709/238
(Continued)

FOREIGN PATENT DOCUMENTS

KR 10-2012-0087715 A   8/2012
KR 10-2012-0134890 A   12/2012
(Continued)

*Primary Examiner* — Obaidul Huq
(74) *Attorney, Agent, or Firm* — Jefferson IP Law, LLP

(57) ABSTRACT

The present disclosure relates to a technique for a sensor network, machine to machine (M2M) communication, machine type communication (MTC) and the Internet of Things (IoT). The present disclosure can be used for intelligent services (services related to a smart home, a smart building, a smart city, a smart car or a connected car, healthcare, digital education, retail business, security and safety and the like) on the basis of the technique. An operating method of a tethering device, according to an embodiment of the present invention, comprises the step of: selecting a first network and/or a second network according to the characteristic of a data request message received from a client device; and transmitting, to the client device, a response message received from a server through the at least one selected network.

20 Claims, 34 Drawing Sheets

(51) Int. Cl.
*H04L 12/26* (2006.01)
*H04W 24/08* (2009.01)
*H04W 28/02* (2009.01)
*H04W 84/12* (2009.01)

(52) U.S. Cl.
CPC ....... *H04W 24/08* (2013.01); *H04W 28/0268* (2013.01); *H04W 88/06* (2013.01); *H04W 84/12* (2013.01)

(58) Field of Classification Search
USPC .......................................... 370/310, 328, 338
See application file for complete search history.

(56) References Cited

U.S. PATENT DOCUMENTS

| | | | |
|---|---|---|---|
| 2006/0155862 A1* | 7/2006 | Kathi | H04L 45/38 709/229 |
| 2010/0080174 A1* | 4/2010 | Zhu | H04W 48/18 370/328 |
| 2013/0060653 A1* | 3/2013 | Sharkey | H04L 69/321 705/26.3 |
| 2013/0064110 A1* | 3/2013 | Polinati | H04L 41/5035 370/252 |
| 2013/0215734 A1* | 8/2013 | Asghar | H04W 24/02 370/216 |
| 2013/0281112 A1 | 10/2013 | Sabatelli et al. | |
| 2013/0286814 A1 | 10/2013 | Lee et al. | |
| 2013/0294306 A1 | 11/2013 | Borges et al. | |
| 2014/0269495 A1* | 9/2014 | Frantz | H04W 48/18 370/328 |
| 2014/0337907 A1* | 11/2014 | Gray | H04N 7/17318 725/110 |
| 2015/0036672 A1 | 2/2015 | Kim et al. | |
| 2015/0195138 A1* | 7/2015 | Horman | H04L 41/0893 709/226 |

FOREIGN PATENT DOCUMENTS

| | | |
|---|---|---|
| KR | 10-2013-0072734 A | 7/2013 |
| WO | 2013/141560 A1 | 9/2013 |
| WO | 2014/051552 A1 | 4/2014 |

* cited by examiner

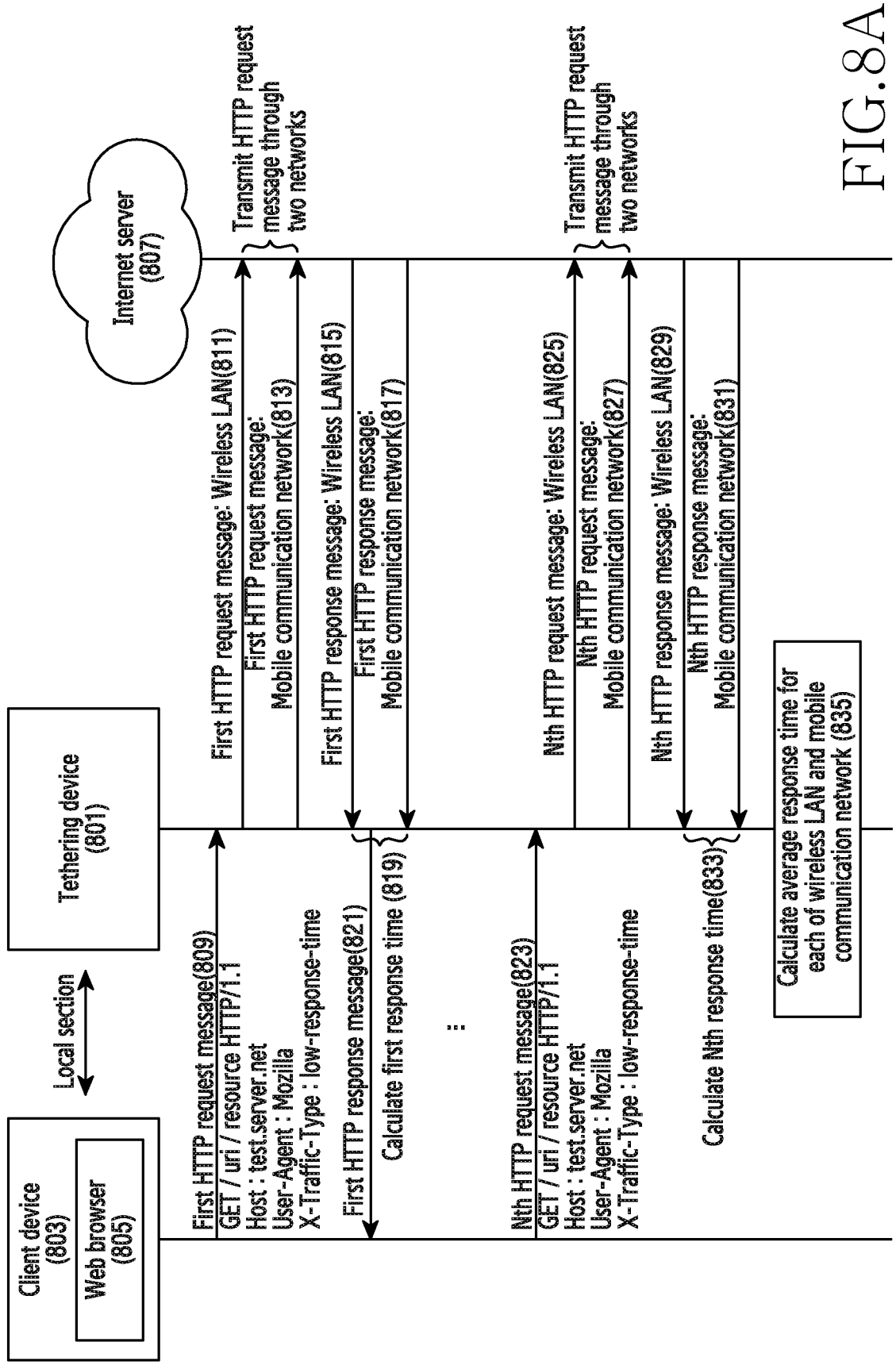

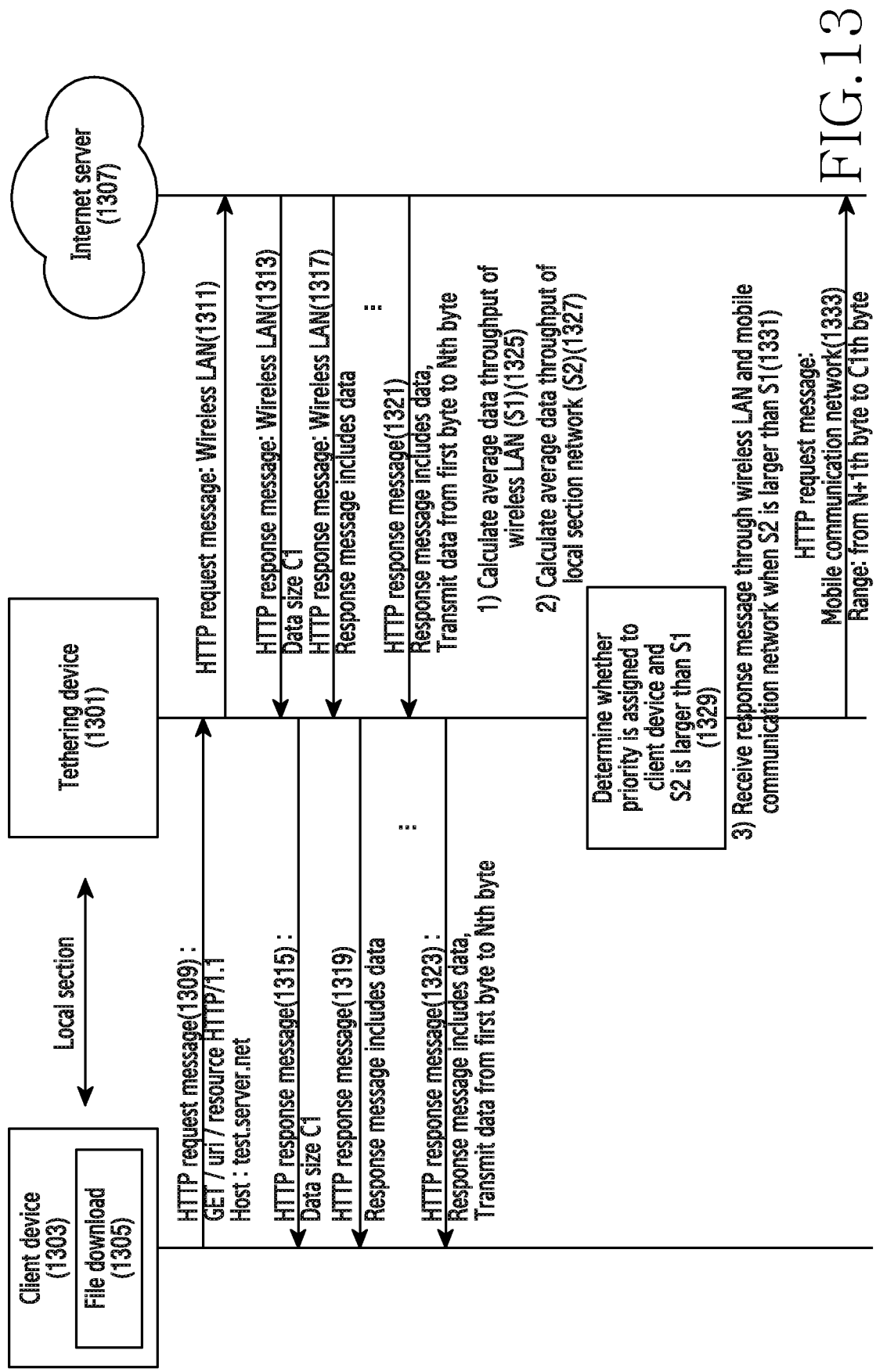

DEVICE AND METHOD FOR ACCESSING MULTIPLE NETWORKS IN WIRELESS COMMUNICATION SYSTEM

CROSS-REFERENCE TO RELATED APPLICATION(S)

This application is a U.S. National Stage application under 35 U.S.C. § 371 of an International application filed on Sep. 11, 2015 and assigned application number PCT/KR2015/009560, which claimed the benefit of a Korean patent application filed on Sep. 11, 2014 in the Korean Intellectual Property Office and assigned Serial number 10-2014-0120248, the entire disclosure of which is hereby incorporated by reference.

TECHNICAL FIELD

The present invention relates to a technology for multi-network access in a wireless communication system.

BACKGROUND ART

The Internet is evolving from a human-oriented connection network, in which humans generate and consume information, to an Internet of Things (IoT) network in which distributed elements, such as objects and the like, exchange and process information. An Internet of Everything (IoE) technology, in which a big data processing technology through a connection with a cloud server or the like is combined with the IoT technology, has emerged. In order to implement the IoT, technical factors such as a sensing technique, wired/wireless communication, network infrastructure, a service interface technology, and a security technology are required, and thus technologies such as a sensor network, Machine to Machine (M2M), Machine Type Communication (MTC), and the like for a connection between objects are recently researched.

In an IoT environment, through the collection and analysis of data generated in connected objects, an intelligent IT (Internet Technology) service to create a new value for the human's life may be provided. The IoT may be applied to fields, such as a smart home, smart building, smart city, smart car, connected car, smart grid, health care, smart home appliance, or high-tech medical service, through the convergence of the conventional IT (Information Technology) and various industries. A technology by which one device having an Internet connection function provides an Internet connection service to another device that requires an Internet connection is referred to as tethering. The device that provides the Internet connection function is referred to as a tethering device, and the device that uses the Internet connection function is referred to as a tethered device.

The Internet connection function is mainly provided through a smart phone having a 3G ($3^{rd}$ Generation) mobile communication function or an LTE (Long Term Evolution) communication function. For example, by connecting a laptop, a tablet PC (Personal Computer), or a wearable device to the smart phone through Wi-Fi (Wireless Fidelity) or BT (Blue Tooth) during a movement mainly outdoors, the Internet connection function may be provided through the smart phone.

As the number of devices possessed by an individual has increased, such as the wearable devices, the need for a bandwidth for the Internet connection of the tethering device has increased. When contents having a high bit rate, such as UHD (Ultra High Definition) contents, are downloaded through the tethering device, the Internet connection of the tethering device should be fast and stable to provide a seamless service.

DETAILED DESCRIPTION OF THE INVENTION

Technical Problem

An embodiment of the present invention provides an apparatus and a method by which a tethering device selects at least one of a plurality of different networks according to a characteristic of a data request message received from a client device.

An embodiment of the present invention provides an apparatus and a method by which the tethering device receives a response message of the data request message from a server through at least one selected network based on the characteristic of the data request message received from the client device and transmits the response message to the client device.

An embodiment of the present invention provides an apparatus and a method by which the tethering device determines a priority of the client device, receives data requested by the client device from the server through at least one of the plurality of different networks according to the priority, and transmits the data to the client device.

An embodiment of the present invention provides an apparatus and a method by which the tethering device calculates at least one of a data response time and data throughput for at least one of the plurality of different networks based on a characteristic of the data request message received from the client device, and selects at least one of the plurality of different networks based on at least one of the characteristics of the data request message, the data response time, the data throughput, and the existence or non-existence of the priority of the client device.

An embodiment of the present invention provides an apparatus and a method by which the client device determines the characteristic of the data request message and transmits the data request message having the determined characteristic to the tethering device.

An embodiment of the present invention provides an apparatus and a method by which the client device receives a tethering service through a plurality of different tethering devices.

An embodiment of the present invention provides an apparatus and a method by which the client device selects at least one tethering device based on the security of the data.

Technical Solution

An electronic device according to an embodiment of the present invention includes: a controller configured to determine whether to use at least one a first network and a second network according to a characteristic of a data request message received from another electronic device; and a communication unit configured to transmit a response message received from a server to the other electronic device through at least one network determined to be used.

An electronic device according to an embodiment of the present invention includes: a controller configured to determine a characteristic of a data request message; and a communication unit configured to transmit the data request message to another electronic device.

A method of operating an electronic device according to an embodiment of the present invention includes: determining whether to use at least one a first network and a second network according to a characteristic of a data request message received from another electronic device; and transmitting a response message received from a server to the other electronic device through at least one network determined to be used.

A method of operating an electronic device according to an embodiment of the present invention includes: determining a characteristic of a data request message; and transmitting the data request message to another electronic device.

BRIEF DESCRIPTION OF THE DRAWINGS

FIGS. 8A and 8B illustrate examples of signal exchange by which the tethering device selects one of a plurality of networks based on an average response time for each of the plurality of networks according to an embodiment of the present invention;

FIG. 13 illustrates an example of signal exchange by which the tethering device simultaneously uses different communication schemes according to an embodiment of the present invention;

MODE FOR CARRYING OUT THE INVENTION

Hereinafter, the operating principle of the present invention will be described in detail with reference to the accompanying drawings. In describing the present invention below, a detailed description of related known configurations or functions incorporated herein will be omitted when it is determined that the detailed description thereof may unnecessarily obscure the subject matter of the present invention. The terms which will be described below are terms defined in consideration of the functions in the present invention, and may be different according to users, intentions of the users, or customs. Therefore, the definitions of the terms should be made based on the contents throughout the specification.

Hereinafter, the present invention describes a technology by which a tethering device transmits data to at least one client device through multi-network access.

The term indicating a characteristic of traffic or a message in the wireless communication system used in the following description, the term indicating a layer in which the traffic or the message is transmitted, and the term expressing items included in a tethering service are only for convenience of the description. Accordingly, the present invention is not limited to the following terms and other terms that refer to targets having the equivalent technical meanings may be used. Further, the present invention is not limited by the following terms and names and may be equally applied to a system complying with another standard.

For convenience of the description, a device that provides an Internet connection service to a device that requires an Internet connection but does not have an Internet connection function is referred to as a "tethering device", and a device that receives an Internet connection service through the tethering device is referred to as a "client device".

Figure 1A:
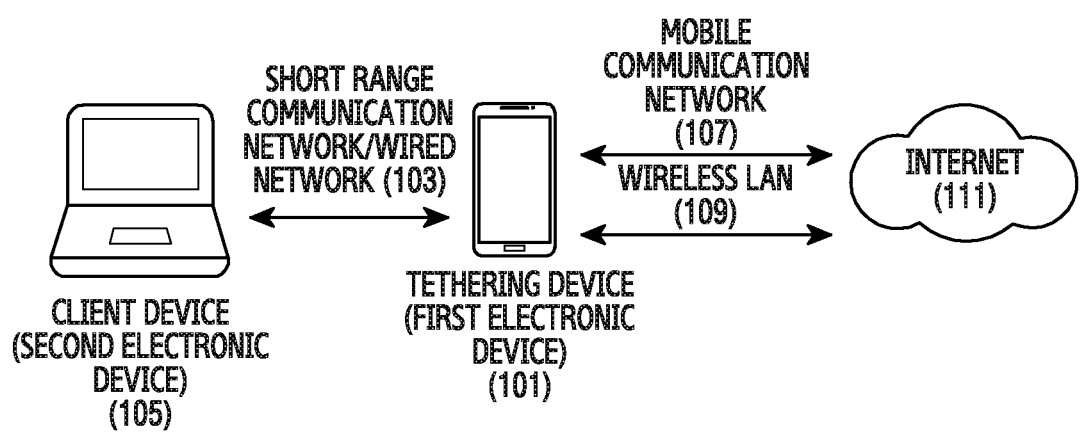
FIGS. 1A and 1B illustrate examples of a communication environment of a tethering device and a client device according to an embodiment of the present invention.
Figure 1B:
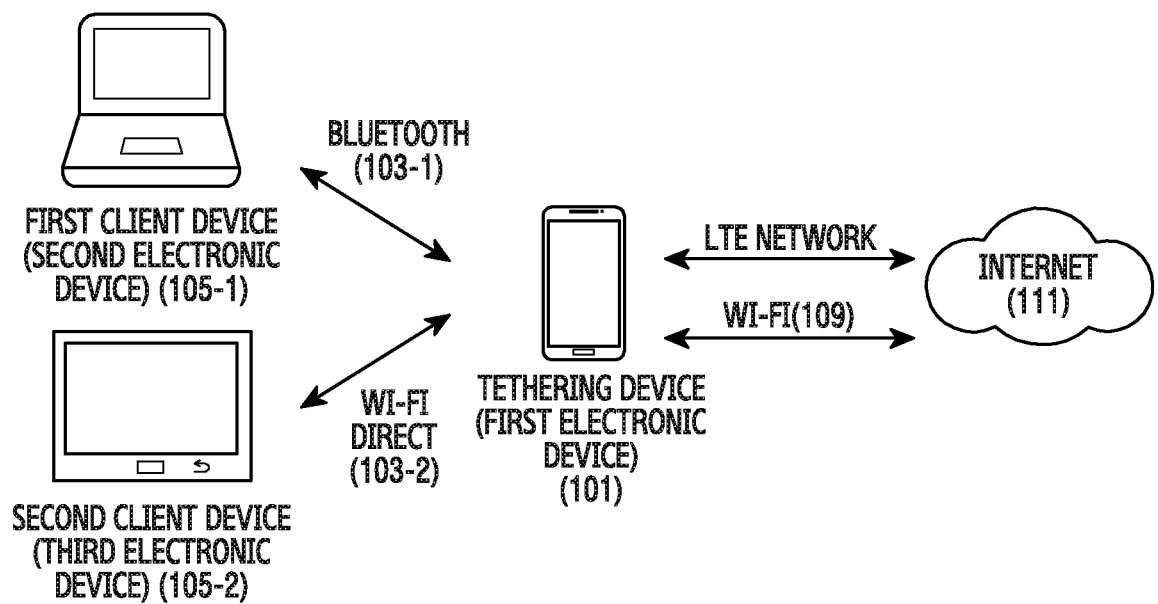

FIGS. 1A and 1B illustrate an example of a communication environment of the tethering device and the client device according to an embodiment of the present invention.

Referring to FIG. 1A, the tethering device (first electronic device) 101 has a function of communicating with the client device (second electronic device) 105 and an Internet server 111. The tethering device (first electronic device) 101 may be connected to the Internet server 111 through at least one of a mobile communication network 107 and a wireless LAN (Local Area Network) 109. For example, the mobile communication network 107 may include at least one of GSM (Global System for Mobile communication), EDGE (Enhanced Data GSM Environment), CDMA (Code Division Multiple Access), and LTE (Long Term Evolution). For example, the wireless LAN 109 may include Wi-Fi (Wireless-Fidelity).

The tethering device (first electronic device) 101 may receive data from the Internet server 111 and transmit the received data to the client device (second electronic device) 105 through a short range communication network or a wired network 103. For example, the short range communication network and the wired network 103 may include at least one of Bluetooth, BLE (Bluetooth Low Energy), NFC (Near Field Communication), Wi-Fi, Wi-Fi direct, WiGig (Wireless Gigabit), Zigbee, UWB (Ultra WideBand), IrDA (Infrared Data Association), and VLC (Visible Light Communication).

The tethering device (first electronic device) 101 may be one of a smart phone, a portable terminal, a mobile phone, a mobile pad, a media player, a tablet computer, a handheld computer, a PDA (Personal Digital Computer), and a wearable device, or may be a device having a function generated by combining two or more functions of the above devices.

The client device (second electronic device) 105 is a device having a function of communicating with the tethering device (first electronic device) 101. The client device (second electronic device) 105 includes a communication means for communicating with the tethering device (first electronic device) 101. For example, the client device (second electronic device) 105 may be one of a smart TV (TeleVision), a monitor, a speaker, a woofer, a black box, a refrigerator, a wrist watch type terminal, a glass type terminal, an electronic device having a communication function which can be worn on clothes, a camera, a beam projector, a CCTV (closed circuit TeleVision), a printer, a fax, a 3D (3-dimension) printer, a smart phone, a portable terminal, a mobile phone, a mobile pad, a media player, a tablet computer, a handheld computer, and a PDA, or may be a device having a function generated by combining two or more functions of the above devices.

Referring to FIG. 1B, the tethering device (first electronic device) 101 may be connected to a first client device (second electronic device) 105-1 and a second client device (third electronic device) 105-2 through different communication schemes 103-1 and 103-2. For example, the tethering device (first electronic device) 101 may be connected to the first client device (second electronic device) 105-1 through a Bluetooth communication scheme 103-1 and connected to the second client device (third electronic device) 105-2 through a Wi-Fi direct communication scheme 103-2. The Wi-Fi direct communication scheme 103-2 refers to a technology by which electronic devices including a Wi-Fi module may perform one-to-one communication or one-to-many communication therebetween without a radio access point (AP).

Figure 2:
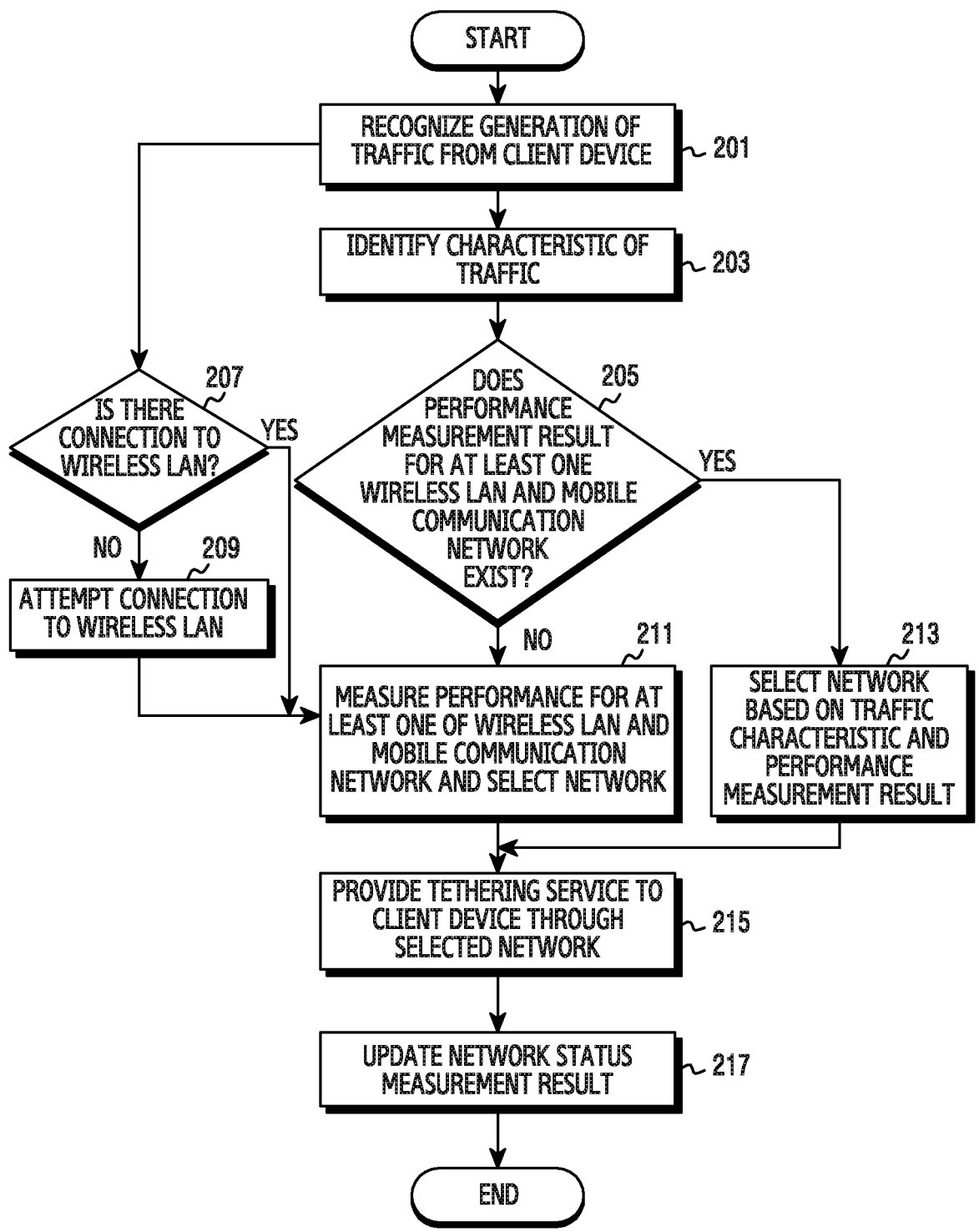
FIG. 2 illustrates an example of an operation order of the tethering device according to an embodiment of the present invention.

FIG. 2 illustrates an example of an operation order of the tethering device according to an embodiment of the present invention.

Referring to FIG. 2, the tethering device recognizes the generation of traffic from the client device in step 201. When the traffic is generated from the client device, the tethering device may recognize the traffic. According to another embodiment of the present invention, the tethering device may recognize the traffic from the client device after activating the tethering function of the tethering device.

The tethering device identifies characteristics of the traffic in step 203. The tethering device may identify the characteristics of the traffic generated from the client device. For example, the characteristics of the traffic may include at least one of background traffic, traffic requiring a low response time, traffic requiring high data throughput, traffic specifying a required response time, and traffic specifying required data throughput.

The tethering device identifies whether there is a performance measurement result for at least one of a wireless LAN and a mobile communication network, which can be connected to the Internet server in step 205. The performance measurement result may include at least one of an average response time and throughput of at least one of the wireless LAN and the mobile communication network. The tethering device proceeds to step 213 when there is the performance measurement result. The tethering device proceeds to step 211 when there is no performance measurement result.

After detecting the traffic in step 201, the tethering device determines whether the tethering device is connected to the wireless LAN in step 207. When the tethering device is connected to the wireless LAN, the tethering device proceeds to step 211.

When the tethering device is not connected to the wireless LAN, the tethering device attempts the connection to the wireless LAN in step 209. When the connection to the wireless LAN fails, the tethering device may continuously search for the wireless LAN to be connected to the wireless LAN.

The tethering device measures performance of at least one of the mobile communication network and the wireless LAN and selects a network based on a result of the performance measurement in step 211. The tethering device may measure at least one of a response time and throughput of at least one of the mobile communication network and the wireless LAN. The tethering device may select at least network from the mobile communication network and the wireless LAN based on the response time and the throughput. For example, when the characteristics of the traffic correspond to traffic requiring high throughput, the tethering device selects one network that provides high throughput between the wireless LAN and the mobile communication network.

When there is the performance measurement result for at least one of the wireless LAN and the mobile communication network in step 205, the tethering device selects at least one network from the wireless LAN and the mobile communication network based on the traffic characteristics and the performance measurement result in step 213. For example, when the traffic characteristics correspond to traffic requiring a low response time, the tethering device may select a network that provides a low response time between the wireless LAN and the mobile communication network.

The tethering device provides a tethering service to the client device through the selected network in step 215. After selecting at least one network based on the characteristics of the traffic generated from the client device and the performance of at least one of the wireless LAN and the mobile communication network, the tethering device may receive data requested by the client device from the Internet server through at least one selected network and transmit the data received from the Internet server to the client device.

The tethering device updates the performance measurement result for at least one of the wireless LAN and the mobile communication network in step 219. The tethering device may store and update the performance measurement result for at least one of the wireless LAN and the mobile communication network.

Figure 3:
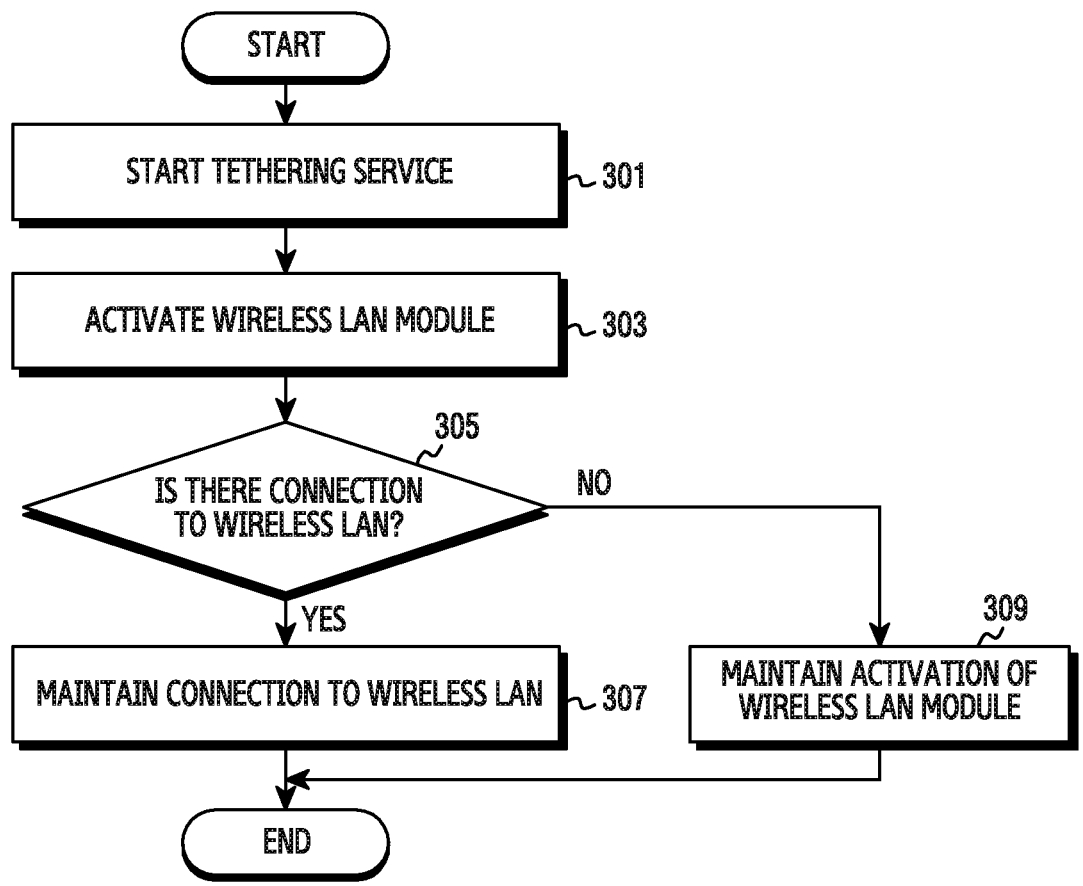
FIG. 3 illustrates an operation order in which the tethering device is connected to a wireless LAN in a state where the tethering device is connected to a mobile communication network according to an embodiment of the present invention.

FIG. 3 is a flowchart illustrating an operation in which the tethering device is connected to the wireless LAN in a state where the tethering device is connected to the mobile communication network according to an embodiment of the present invention.

Referring to FIG. 3, the tethering device starts a tethering service in step 301. The tethering device may activate the tethering service function to start the tethering service to at least one client device in a state where the tethering device is connected to the mobile communication network.

The tethering device activates a wireless LAN module in step 303. The tethering device may activate the wireless LAN module to be connected to the wireless LAN when traffic from the client device is generated in the state where the tethering device is connected to the mobile communication network.

The tethering device attempts the connection to at least one wireless LAN in step 305. When the tethering device is connected to at least one wireless LAN, the tethering device proceeds to step 307. When the tethering device is not connected to at least one wireless LAN, the tethering device proceeds to step 309.

When the tethering device is connected to at least one wireless LAN, the tethering device maintains the state where the tethering device is connected to at least one wireless LAN in step 307. The tethering device may be connected to the mobile communication network and the wireless LAN.

When the tethering device is not connected to at least one wireless LAN, the tethering device may maintain the activated state of the wireless LAN module to be connected to the wireless LAN when traffic from the client device is generated in step 309.

Figure 4:
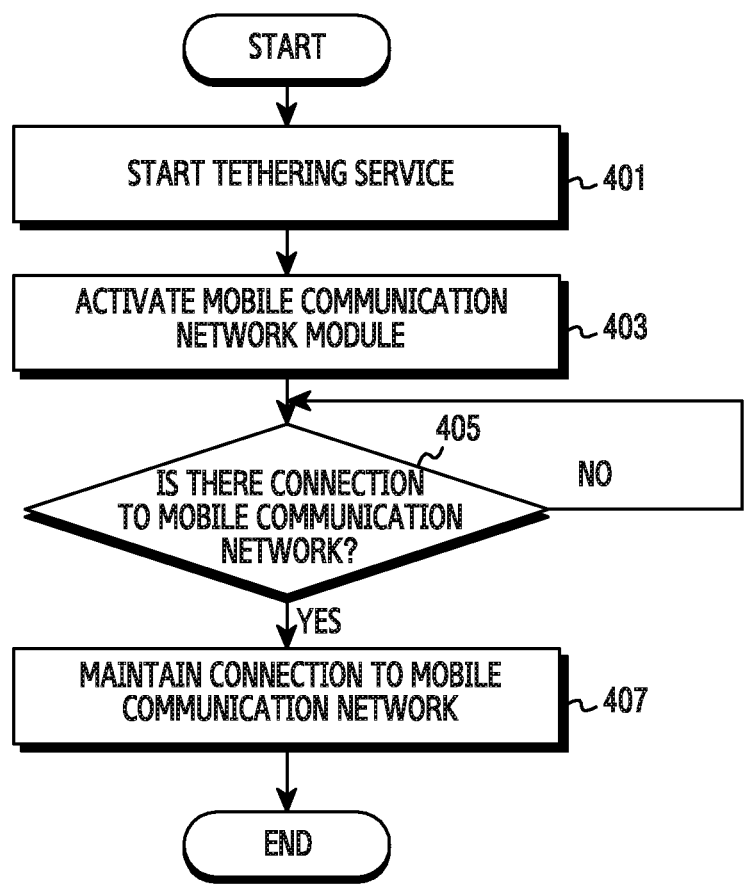
FIG. 4 illustrates an operation order in which the tethering device is connected to the mobile communication network in a state where the tethering device is connected to the wireless LAN according to an embodiment of the present invention.

FIG. 4 is a flowchart illustrating an operation in which the tethering device is connected to the mobile communication network in a state where the tethering device is connected to the wireless LAN according to an embodiment of the present invention.

Referring to FIG. 4, the tethering device starts a tethering service in step 401. The tethering device may activate a tethering service function to start the tethering service to the client device in the state where the tethering device is connected to the wireless LAN.

The tethering device activates a mobile communication network module in step 403. The tethering device may activate the mobile communication module to access the mobile communication network in the state where the tethering device is connected to the wireless LAN.

The tethering device attempts the connection to the mobile communication network in step 405. When the tethering device is not connected to the mobile communication network, the tethering device may repeat the attempt of the connection to the mobile communication network.

When the tethering device is connected to the mobile communication network the tethering device maintains the connection to the mobile communication network in step 407. The tethering device may maintain a continuous connection to the wireless LAN and the mobile communication network.

Figure 5:
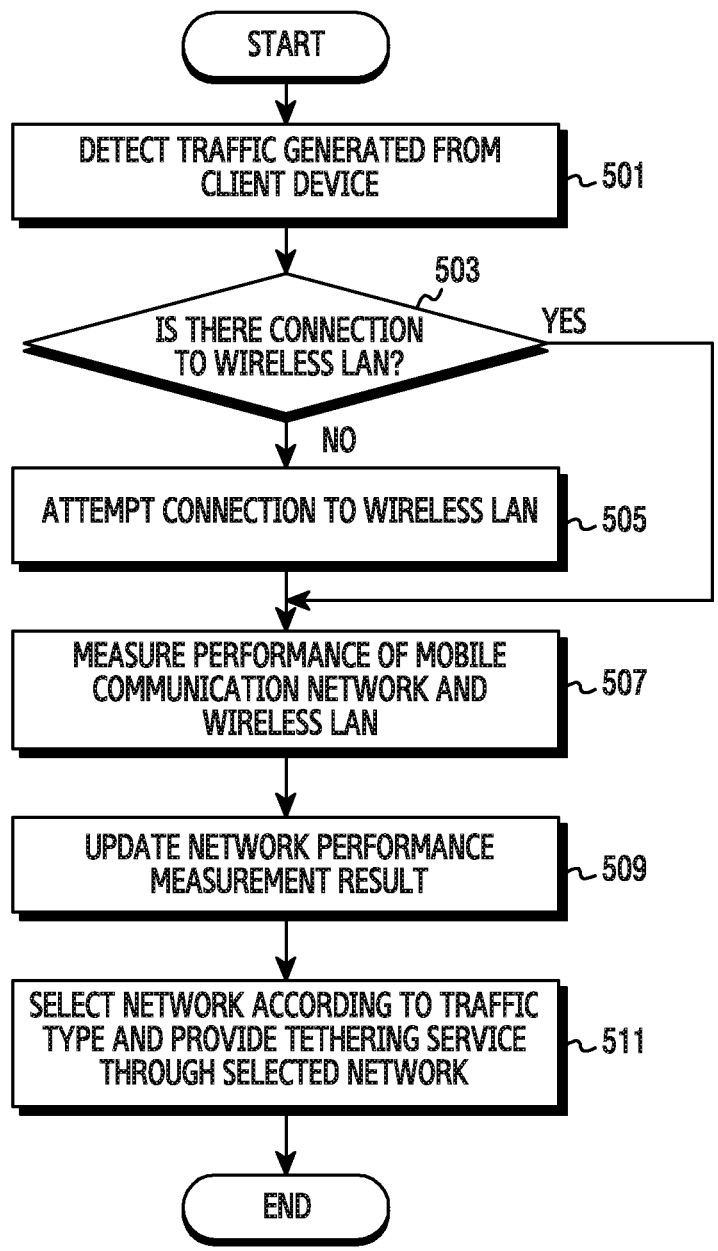
FIG. 5 illustrates an order in which the tethering device selects at least one network and provides a tethering service to the client device according to an embodiment of the present invention.

FIG. 5 is a flowchart illustrating an operation in which the tethering device selects at least one network and provides a tethering service to the client device according to an embodiment of the present invention.

Referring to FIG. 5, the tethering device detects traffic generated from the client device in step 501. The tethering device may detect the traffic when the traffic is generated from the client device. According to another embodiment of the present invention, the tethering device may recognize the traffic from the client device after activating the tethering service function.

The tethering device determines whether the tethering device is connected to the wireless LAN in step 503. When the tethering device is not connected to the wireless LAN, the tethering device proceeds to step 505. When the tethering device is connected to the wireless LAN, the tethering device proceeds to step 507.

When the tethering device is not connected to the wireless LAN, the tethering device attempts the connection to the wireless LAN in step 505. The tethering device may search for the wireless LAN and attempt the connection to the found wireless LAN.

When the tethering device is connected to the wireless LAN, the tethering device measures performance of the mobile communication network and the wireless LAN in step 507. For example, the tethering device may measure at least one of a response time and throughput of the mobile communication network and the wireless LAN.

The tethering device updates a network performance measurement result in step 509. The tethering device may measure at least one of the response time and the throughput for at least one of the mobile communication network and the wireless LAN, and may store the measurement result in a network state table. For example, when the tethering device is connected to the mobile communication network and the wireless LAN, the network performance measurement result may be as shown in [Table 1] below.

TABLE 1

| Network type | Connection state | Response time | Throughput |
|---|---|---|---|
| Wireless LAN | connected | First response time | First throughput |
| Mobile communication network | connected | Second response time | Second throughput |

When the tethering device is connected to only the mobile communication network, the network performance measurement result may be as shown in [Table 2] below.

TABLE 2

| Network type | Connection state | Response time | Throughput |
|---|---|---|---|
| Wireless LAN | Non-connected | — | — |
| Mobile communication network | connected | Second response time | Second throughput |

When the traffic is generated from at least one client device, the tethering device may select a network based on the traffic characteristics and the network performance measurement result. According to another embodiment of the present invention, the tethering device may initialize the network performance measurement result. For example, the tethering device may initialize the network performance measurement result in at least one of a case where the connection to at least one of the mobile communication network and the wireless LAN is terminated, a case where at least one access point of at least one of the mobile communication network and the wireless LAN is changed, and a case where a signal strength of at least one of the mobile communication network and the wireless LAN is equal to or lower than a predetermined threshold value.

The tethering device selects the network according to the traffic characteristics and provides the tethering service through the selected network in step 511. The tethering device may select one of the mobile communication network and the wireless LAN according to the characteristics of the traffic generated from at least one client device. The tethering device may transmit a data request message that the client device requests to the Internet server device and may receive a response message through the selected network. For example, the traffic characteristics may be classified as shown in [Table 3] below.

TABLE 3

| Mode | Application | Characteristic | Used network |
|---|---|---|---|
| Background | Content synchronization/ Software update | Delay is possible and fast response is not requested | Wireless LAN |
| Foreground | Web browser/ Messenger | Delay is not possible and fast response is requested | Use a network that provides a low response time |
| | File download/ File upload | Delay is not possible and high throughput is requested | Use a network that provides high throughput |
| Default | — | — | Wireless LAN |

The tethering device may select at least one of the mobile communication network and the wireless LAN according to the characteristics of the traffic generated from at least one client device and may provide the tethering service to at least one client device. For example, when the traffic corresponds to background traffic, delay transmission for the traffic is possible and the traffic may be transmitted by a slow response. In contrast, when the traffic corresponds to foreground traffic, the traffic generated by a control of the user of at least one client device is required to have a fast response. When the traffic corresponds to traffic of a web browser, the traffic may be required to have a fast response rather high throughput. Further, when the traffic corresponds to traffic for a file download, the traffic may be required to have high throughput.

The tethering device may receive an HTTP (HyperText Transfer Protocol) header in a predetermined field including the traffic characteristic from at least one client device. For example, the traffic characteristic may be included in the HTTP header as shown in [Table 4] below.

TABLE 4

| Traffic characteristics | Predefined field of HTTP header | Others |
|---|---|---|
| Background | HTTP Request<br>GET/uri/resource HTTP/1.1<br>Host: test.server.net<br>X-Traffic-Type: background | |
| Web browser | HTTP Request<br>GET/uri/resource HTTP/1.1<br>Host: test.server.net<br>User-Agent: Mozilla<br>X-Traffic-Type: low-response-time | |
| | HTTP Request<br>GET/uri/resource HTTP/1.1<br>Host: test.server.net<br>User-Agent: AndroidDownloadManager<br>X-Traffic-Type: low-response-time 100 ms | Specify response time |
| File download | HTTP Request<br>GET/uri/resource HTTP/1.1<br>Host: test.server.net<br>User-Agent: AndroidDownloadManager<br>X-Traffic-Type: high-throughput | |
| | HTTP Request<br>GET/uri/resource HTTP/1.1<br>Host: test.server.net<br>User-Agent: AndroidDownloadManager<br>X-Traffic-Type: high-throughput 1 Mbps | Specify throughput |

FIGS. 6A to 6D illustrate examples of signal exchange when the tethering device has background traffic generated from the client device according to an embodiment of the present invention.

Figure 6A:
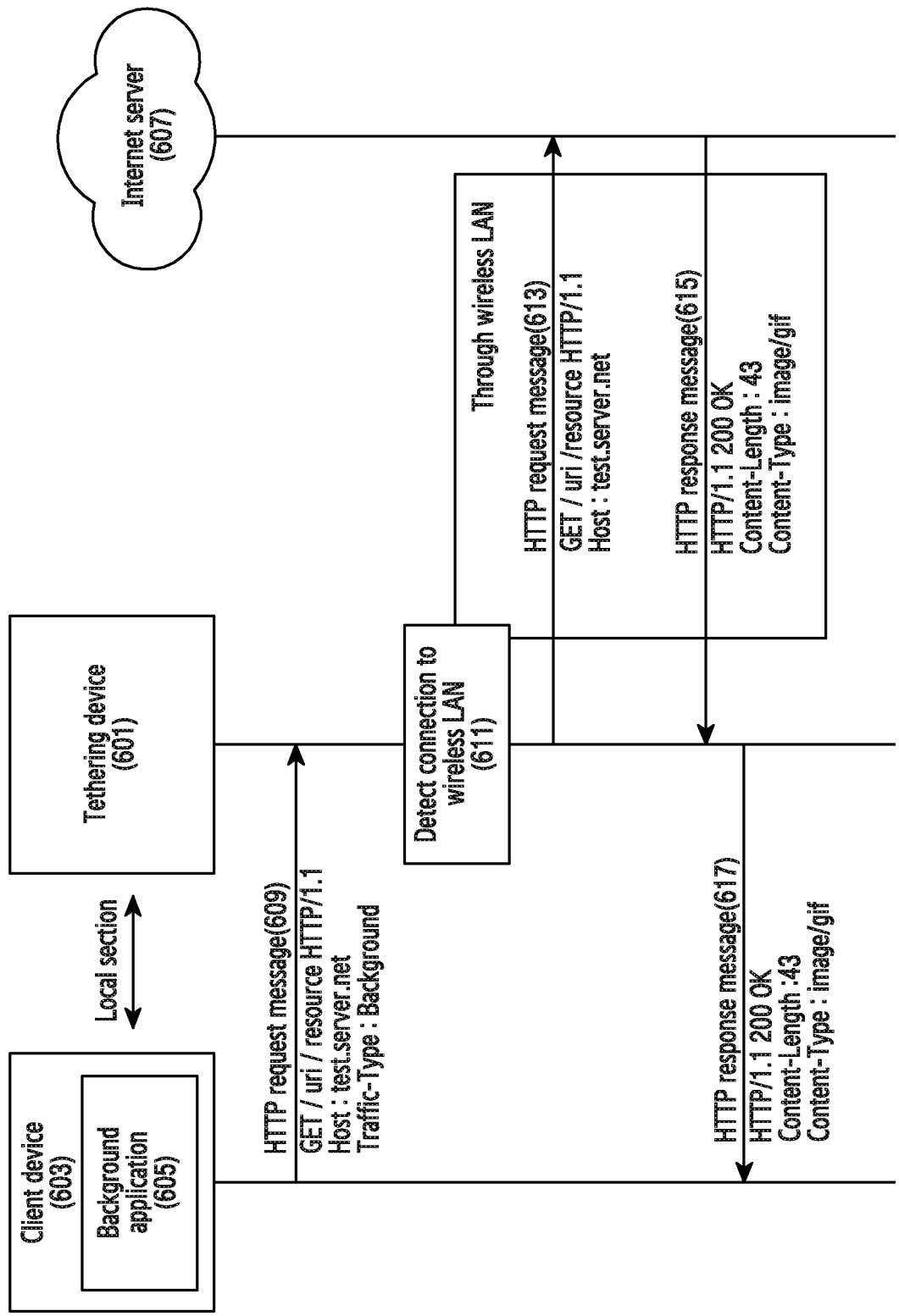
FIGS. 6A to 6D illustrate examples of signal exchange when the tethering device has background traffic generated from the client device according to an embodiment of the present invention.

Referring to FIG. 6A, a tethering device 601 receives an HTTP request message 609 for traffic of a background application 605 from a client device 603 in a state where the tethering device 601 is connected to an Internet server 607 through a wireless LAN. Traffic characteristics may be expressed in a predetermined field of a header of the HTTP request message 609. For example, the HTTP request message 609 may include "Traffic-Type: Background" as information indicating the traffic characteristics. The tethering device 601 may detect a connection of the tethering device 601 to the wireless LAN as indicated by a reference numeral 611. The tethering device 601 transmits the HTTP request message 613 received from the client device 603 to the Internet server 607 through the wireless LAN. The Internet server 607 transmits an HTTP response message 615 including data requested by the client device 603 to the tethering device 601 according to the HTTP request message 613 received from the tethering device 601. At least one of a size of the data and a characteristic of the data may be expressed in a header of the HTTP response message 615. For example, when the data corresponds to a GIF (Graphics Interchange Format) image of 43 bytes, "Content-Length: 43, Content-Type: image/gif" may be expressed in the header of the HTTP response message. The tethering device 601 may transmit the HTTP response message 617 received from the Internet server 607 to the client device 603.

Figure 6B:
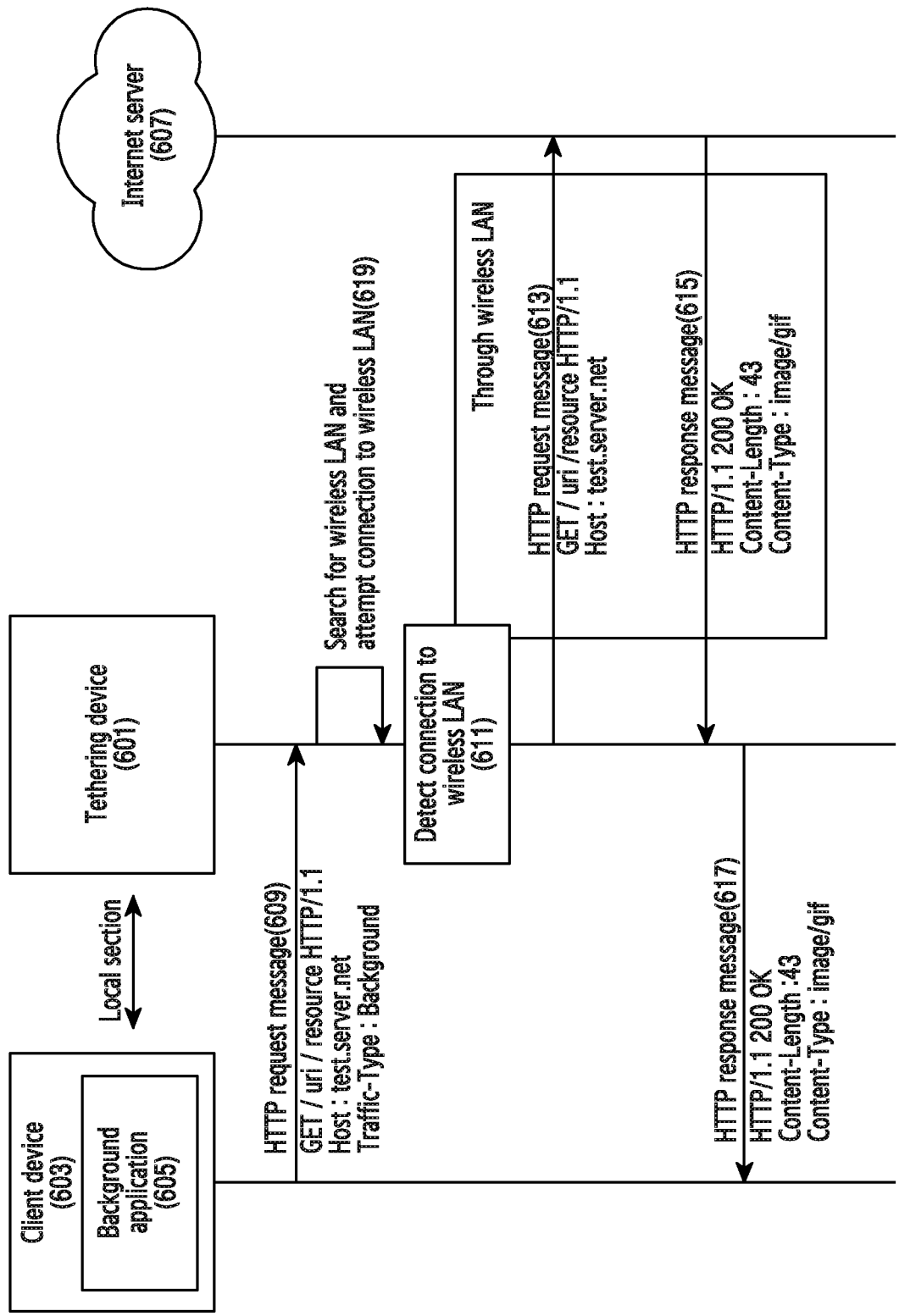

Referring to FIG. 6B, according to another embodiment of the present invention, when the tethering device 601 is not connected to the wireless LAN, the tethering device 601 receives the HTTP request message 609 from the client device 603. The tethering device 601 may activate a wireless LAN module, search for at least one radio access point through the activated wireless LAN module, and attempt a connection to the found access point as indicated by a reference numeral 619. The tethering device 601 may detect the connection to the wireless LAN based on a result of the attempt of the connection to the found access point as indicated by a reference numeral 611. The tethering device 601 may transmit the HTTP request message 613 to the Internet server 607 through the connected wireless LAN and may receive the HTTP response message 615 from the Internet server 607 in response to the HTTP request message 613. The tethering device 601 may transmit the HTTP response message 617 received from the Internet server 607 to the client device 603.

Figure 6C:
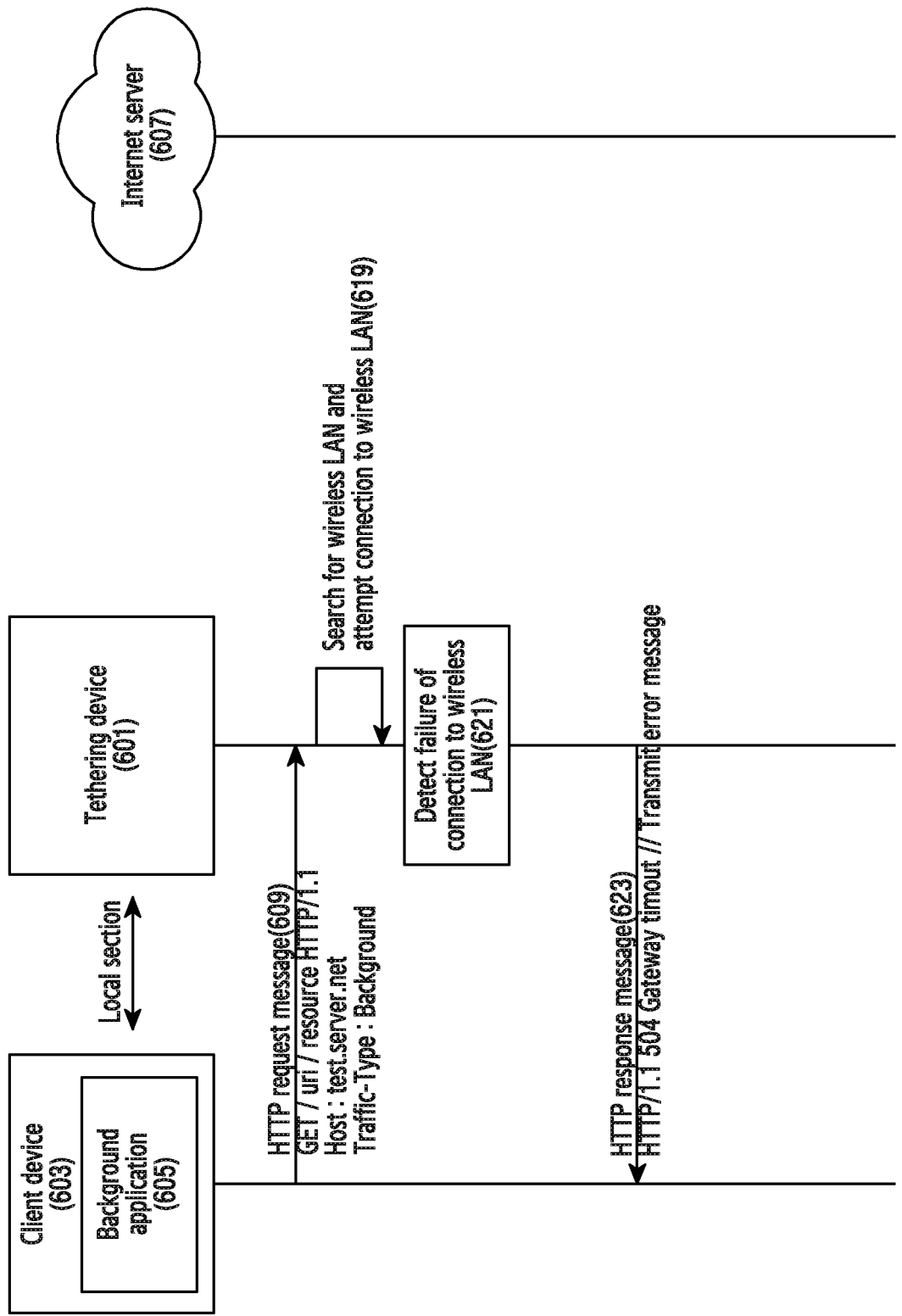

According to another embodiment of the present invention, referring to FIG. 6C, the tethering device 601 may detect failure of the connection to the wireless LAN as indicated by a reference numeral 621. The tethering device 601 may transmit an HTTP response message 623 indicating that the connection to the Internet server 607 is not made to the client device 603. That is, when the tethering device 601 detects the wireless LAN connection failure as indicated by a reference numeral 621, the tethering device 601 may transmit an error message to the client device 603. According to another embodiment of the present invention, when the tethering device 601 is not connected to the wireless LAN as indicated by a reference numeral 621, the tethering device 601 may not transmit the HTTP response message indicating that the connection to the Internet server 607 is not made to the client device 603.

Figure 6D:
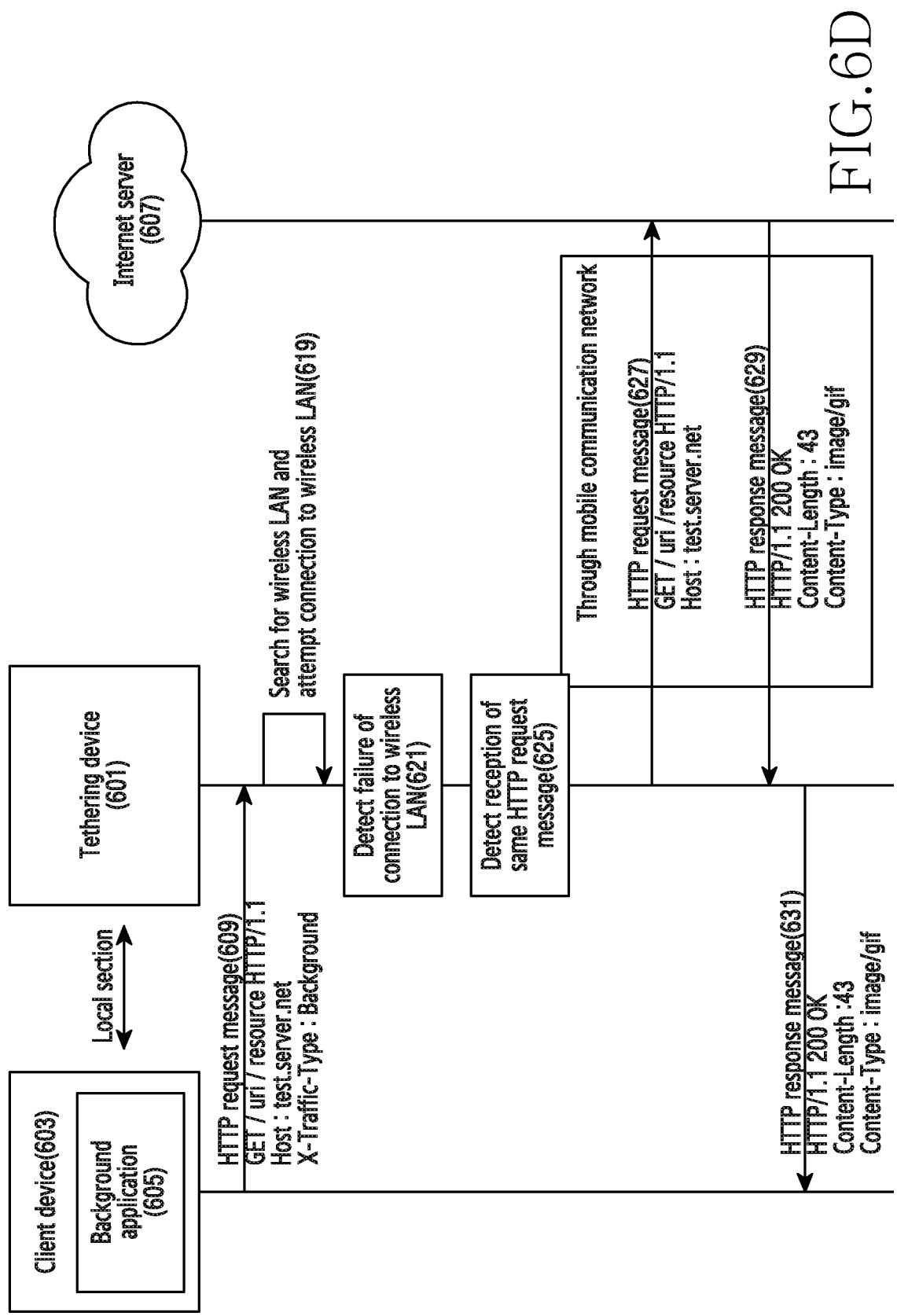

Referring to FIG. 6D, the tethering device 601 may detect failure of the connection to the wireless LAN as indicated by the reference numeral 621. The tethering device 601 may determine whether the HTTP request message 609 received from the client device 603 is the same as the previously received HTTP request message and may detect that the same HTTP request message has been received as indicated by a reference numeral 625. When the tethering device 601 detects that the same HTTP request message has been received from the client device 603 in the state where the tethering device 601 is not connected to the wireless LAN, the tethering device 601 may transmit the HTTP request message 627 to the Internet server 607 through the mobile communication network. For example, when the client device 603 repeatedly transmits the HTTP request message to the tethering device 601 to request data for an update in the background, the tethering device 601 may transmit the data to the client device 603 through the mobile communication network to update the client device 603. The tethering device 601 may receive an HTTP response message 629 from the Internet server 607 through the mobile communication network in response to the HTTP request message 627. The tethering device 601 may transmit the HTTP response message 632 received from the Internet server 607 to the client device 603.

An element that is illustrated in one of FIGS. 6A to 6D but has not been described may have the same characteristic as that of an element having the same reference numeral and/or the same name in another one of FIGS. 6A to 6D or may perform the same operation, so that a description thereof has been omitted for convenience of the description. For example, a description of information included in the HTTP request messages 609 and 613 and the response messages 615 and 617 has been omitted in FIG. 6B because the messages have the same characteristics as those of the HTTP request messages 609 and 613 and the HTTP response messages 615 and 617 illustrated in FIG. 6A. According to another example, a description of the operation in which the tethering device 601 receives the HTTP request message 609 and operation 619 for searching for the wireless LAN and attempting the connection has been omitted in FIG. 6C because the operations are the same as those having the same reference numeral and the same name in FIG. 6B.

Figure 7:
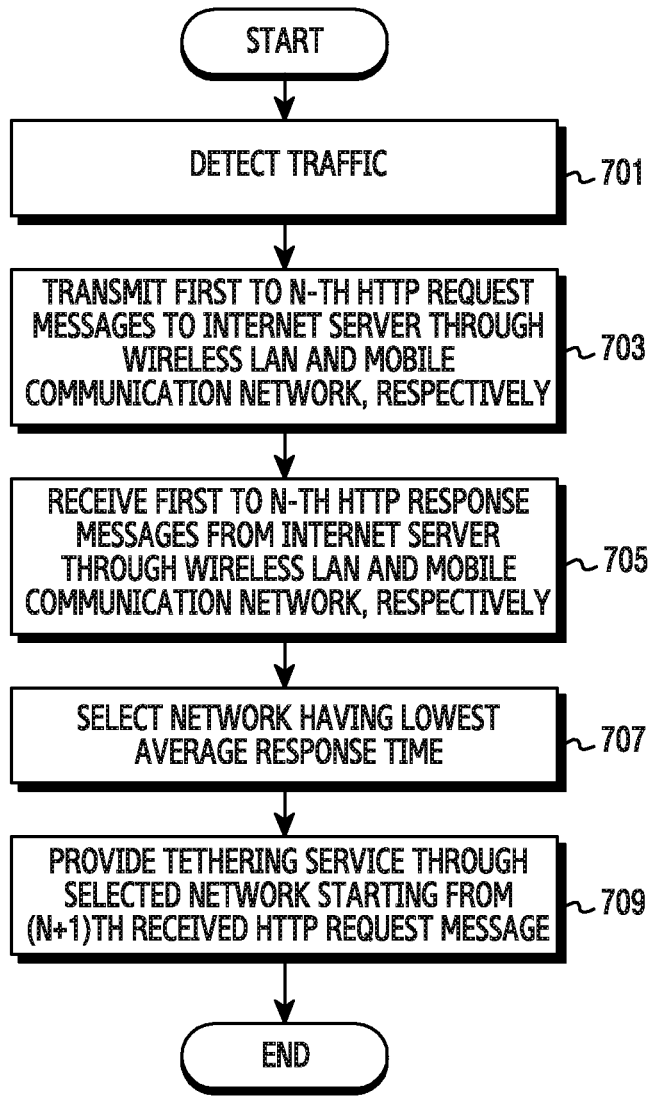
FIG. 7 illustrates an operation order in which the tethering device selects a network when there is no network performance measurement result according to an embodiment of the present invention.

FIG. 7 is a flowchart illustrating an operation in which the tethering device selects a network when there is no network performance measurement result according to an embodiment of the present invention.

Referring to FIG. 7, the tethering device detects traffic generated from at least one client device in step 701. The tethering device may identify characteristics of the traffic generated from at least one client device. The characteristics of the traffic may be included in a pre-appointed field of a header of the traffic. The tethering device may identify the characteristics of the traffic expressed in the pre-appointed field of the header of the traffic. For example, the characteristics of the traffic may include at least one of background traffic, traffic for web browsing, traffic for file download, traffic requiring a low response time, traffic requiring high data throughput, traffic specifying a required response time, and traffic specifying required throughput.

The tethering device transmits first to $N^{th}$ ($N\geq1$) HTTP request messages to the Internet server through the wireless LAN and the mobile communication network in step 703. For example, the tethering device may transmit the first to $N^{th}$ HTTP request messages received from the client device to the Internet server through each of the wireless LAN and the mobile communication network.

The tethering device may receive first to $N^{th}$ response messages from the Internet server through each of the wireless LAN and the mobile communication network in response to the first to $N^{th}$ HTTP request messages that have been transmitted to the Internet server in step 705. The tethering device may calculate an average response time of each of the wireless LAN and the mobile communication network based on the first to $N^{th}$ HTTP response messages.

The tethering device selects a network having the shortest average response time in step 707. The tethering device may select the network having the shortest response time between the wireless LAN and the mobile communication network based on the average response time measured for each of the wireless LAN and the mobile communication network.

Starting at an $N+1^{th}$ HTTP request message received from the client device, the tethering device provides the tethering service through the selected network in step 709. The tethering device updates information on the average response time measured for the wireless LAN and the mobile communication network. The tethering device may store the information on the average response time measured for each of the wireless LAN and the mobile communication network.

Figure 8B:
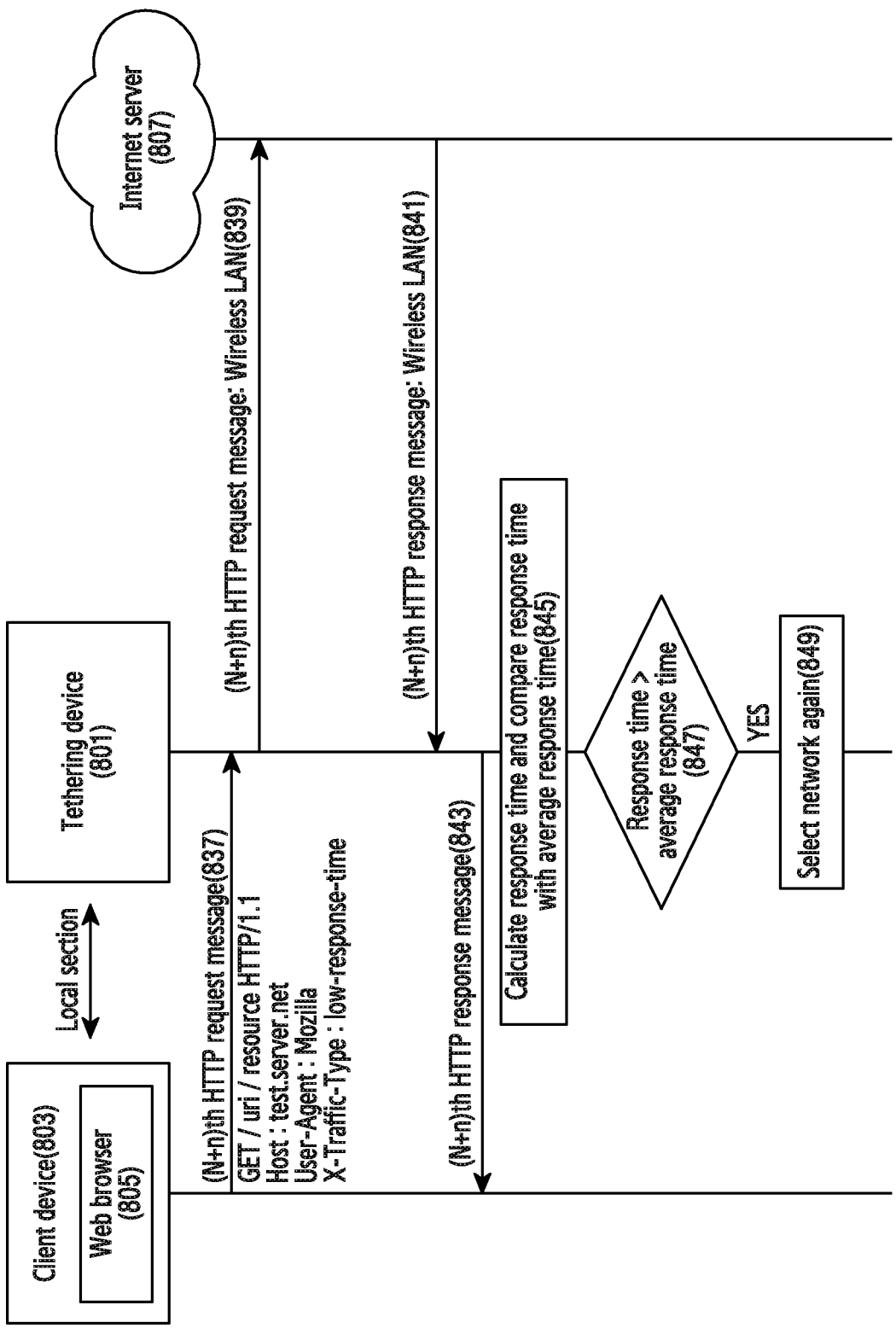

FIGS. 8A and 8B illustrate examples of signal exchange by which the tethering device selects one of a plurality of networks based on an average response time for each of the plurality of networks according to an embodiment of the present invention. When there is no information on a performance measurement result for the plurality of networks, the tethering device may calculate an average response time for each of the plurality of networks.

Referring to FIG. 8A, a tethering device 801 receives a first HTTP request message 809 from a client device 803. For example, the tethering device 801 may receive the first HTTP request message 809 for a web browser application 805 from the client device 803. The client device 803 may include characteristics of the traffic in a pre-appointed field of a header of the first HTTP request message 809. For example, an indication indicating that the traffic corresponds to traffic requiring a low response time may be included in the pre-appointed field. For example, the indication may be "X-Traffic-Type: low-response-time".

The tethering device 801 may transmit the first HTTP request messages 811 and 813 to the Internet server 807 through the wireless LAN and the mobile communication network, respectively. In other words, the tethering device 801 may transmit the first HTTP request message 813 through the mobile communication network simultaneously with transmitting the first HTTP request message 811 through the wireless LAN. The Internet server 807 may transmit first HTTP response messages 815 and 817 to the tethering device 801 through the wireless LAN and the mobile communication network in response to the first HTTP request messages 811 and 813, respectively. The tethering device 801 may calculate a response time for the first HTTP response messages 815 and 817 received from the Internet server 807 as indicated by a reference numeral 819. That is, the tethering device 801 may calculate a first response time for the first HTTP response message 815 received through the wireless LAN and a first response time for the first HTTP response message 817 received through the mobile communication network. The tethering device 801 may transmit a first HTTP response message 821 received through the Internet server 807 to the client device 803.

The tethering device 801 may receive an $N^{th}$ HTTP request message 823 from the client device 803. The tethering device 801 may receive each of the first HTTP request message 809 to the $N^{th}$ HTTP request message 823 from the client device 803. The tethering device 801 may transmit the $N^{th}$ HTTP request messages 825 and 827 to the Internet server 807 through the wireless LAN and the mobile communication network, respectively. The Internet server 807 may transmit HTTP response messages 829 and 831 to the tethering device 801 through the wireless LAN and the mobile communication network in response to the $N^{th}$ HTTP request messages 825 and 827, respectively. The tethering device 801 may calculate an $N^{th}$ response time for each of $N^{th}$ response messages 829 and 831 received from the Internet server 807 as indicated by a reference numeral 833. In other words, the tethering device 801 may calculate the $N^{th}$ response time based on a time point when the $N^{th}$ HTTP request message is transmitted through each of the wireless LAN and the mobile communication network and a time point when the $N^{th}$ HTTP response message is received. The tethering device 801 may calculate an average response time of the first response time to the $N^{th}$ response time calculated for each of the wireless LAN and the mobile communication network as indicated by reference numeral 835. The tethering device 801 may select a network having a short average response time between the wireless LAN and the mobile communication network.

Referring to FIG. 8B, the tethering device 801 receives an $N+n^{th}$ ($n\geq1$) HTTP request message 837 from a client device 803. When the wireless LAN is selected based on a result of the calculation of the average response time for the wireless LAN and the mobile communication network, the tethering device 801 transmits the $N+n^{th}$ HTTP request message 839 to the Internet server 807 through the wireless LAN. The Internet server 807 transmits an $N+n^{th}$ HTTP response message 841 to the tethering device 801 through the wireless LAN in response to the $N+n^{th}$ HTTP request message 839. The tethering device 801 transmits the $N+n^{th}$ HTTP response message 843 received from the Internet server 807 to the client device 803.

The tethering device 801 calculates a response time for the $N+n^{th}$ HTTP response message 841 received from the Internet server 807 and compares the response time for the $N+n^{th}$ HTTP response message 841 with the average response time previously measured for the first to $N^{th}$ HTTP response messages as indicated by a reference numeral 845. At this time, the tethering device 801 may determine whether the response time for the $N+n^{th}$ HTTP response message 841 received from the Internet server 807 is longer than the average response time previously measured for each of the wireless LAN and the mobile communication network. When it is detected that the response time for the $N+n^{th}$ HTTP response message 841 is longer than the previously calculated average response time as indicated by a reference numeral 847, the tethering device 801 performs the network selection process illustrated in FIG. 8A again as indicated by a reference numeral 849.

Figure 9:
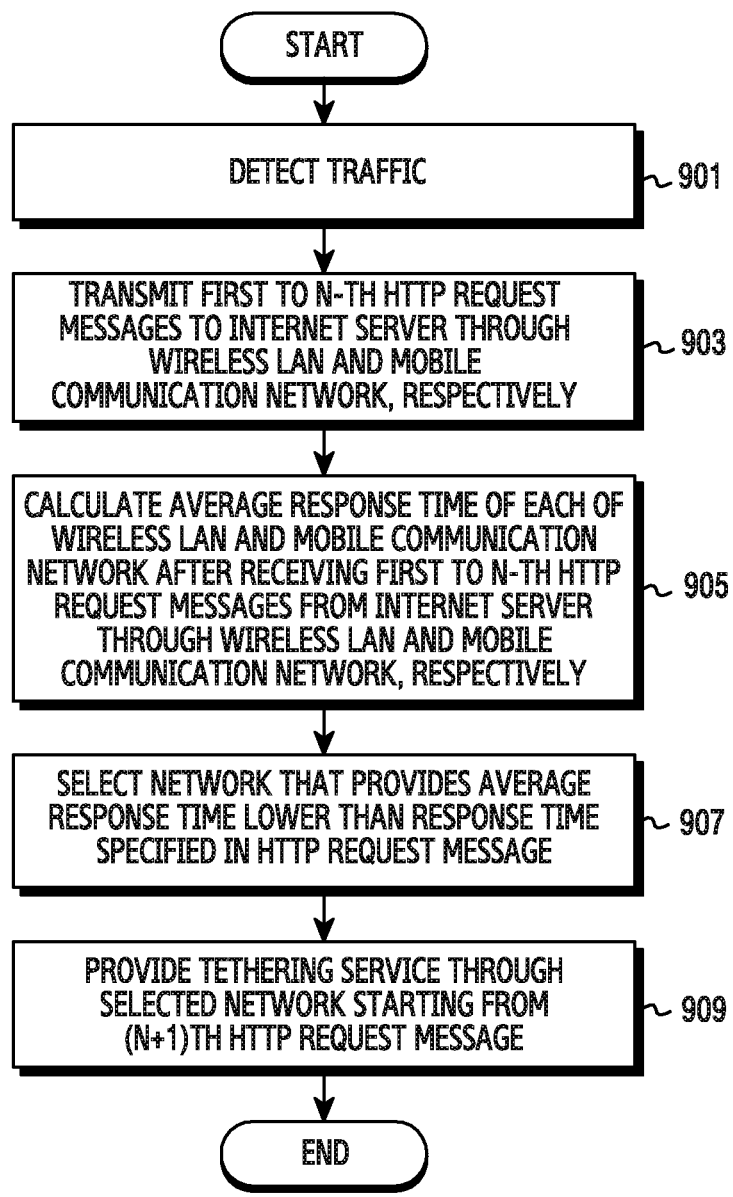
FIG. 9 illustrates an order in which the tethering device selects a network based on a response time according to an embodiment of the present invention.

FIG. 9 is a flowchart illustrating an operation in which the tethering device selects a network based on a response time according to an embodiment of the present invention.

The tethering device detects traffic generated from the client device in step 901. The tethering device may identify characteristics of the traffic generated from the client device. The tethering device may identify the characteristics of the traffic expressed in a pre-appointed field of a header of the traffic signal. The pre-appointed field of the header of the traffic signal may include the characteristics of the traffic. For example, a response time required by the traffic may be expressed in the characteristics of the traffic.

The tethering device transmits the first to $N^{th}$ HTTP request messages sequentially received from the client device through each of the wireless LAN and the mobile communication network to the Internet server in step 903. The tethering device may transmit the first to $N^{th}$ HTTP request messages to the Internet server according to a sequential order received from the client device.

The tethering device receives HTTP response messages from the Internet server in response to the HTTP request messages in step 905. The tethering device may receive first to $N^{th}$ HTTP response messages from the Internet server through each of the wireless LAN and the mobile communication network in response to the first to $N^{th}$ HTTP request messages. The tethering device may calculate an average response time of each of the wireless LAN and the mobile communication network for the first to $N^{th}$ HTTP response messages.

The tethering device selects one network that provides a response time equal to or shorter than the response time stated in the HTTP request message among the average response time in step 907. The tethering device may select one network that provides an average response time equal to or shorter than the response time between the wireless LAN and the mobile communication network. For example, when the response time stated in the traffic corresponds to 100 ms, the tethering device may select one network having the average response time equal to or shorter than 100 ms between the wireless LAN and the mobile communication network. According to another embodiment of the present invention, the tethering device may first select the wireless LAN before selecting the wireless LAN or the mobile communication network.

Starting at an $N+1^{th}$ HTTP request message, the tethering device provides the tethering service to the client device through the selected network in step 909. The tethering device may transmit the $N+1^{th}$ HTTP request message received from the client device to the Internet server through the selected network. The tethering device may receive an $N+1^{th}$ response message from the Internet server in response to the N+1$^{th}$ HTTP request message and may transmit the N+1$^{th}$ response message to the client device.

Figure 10:
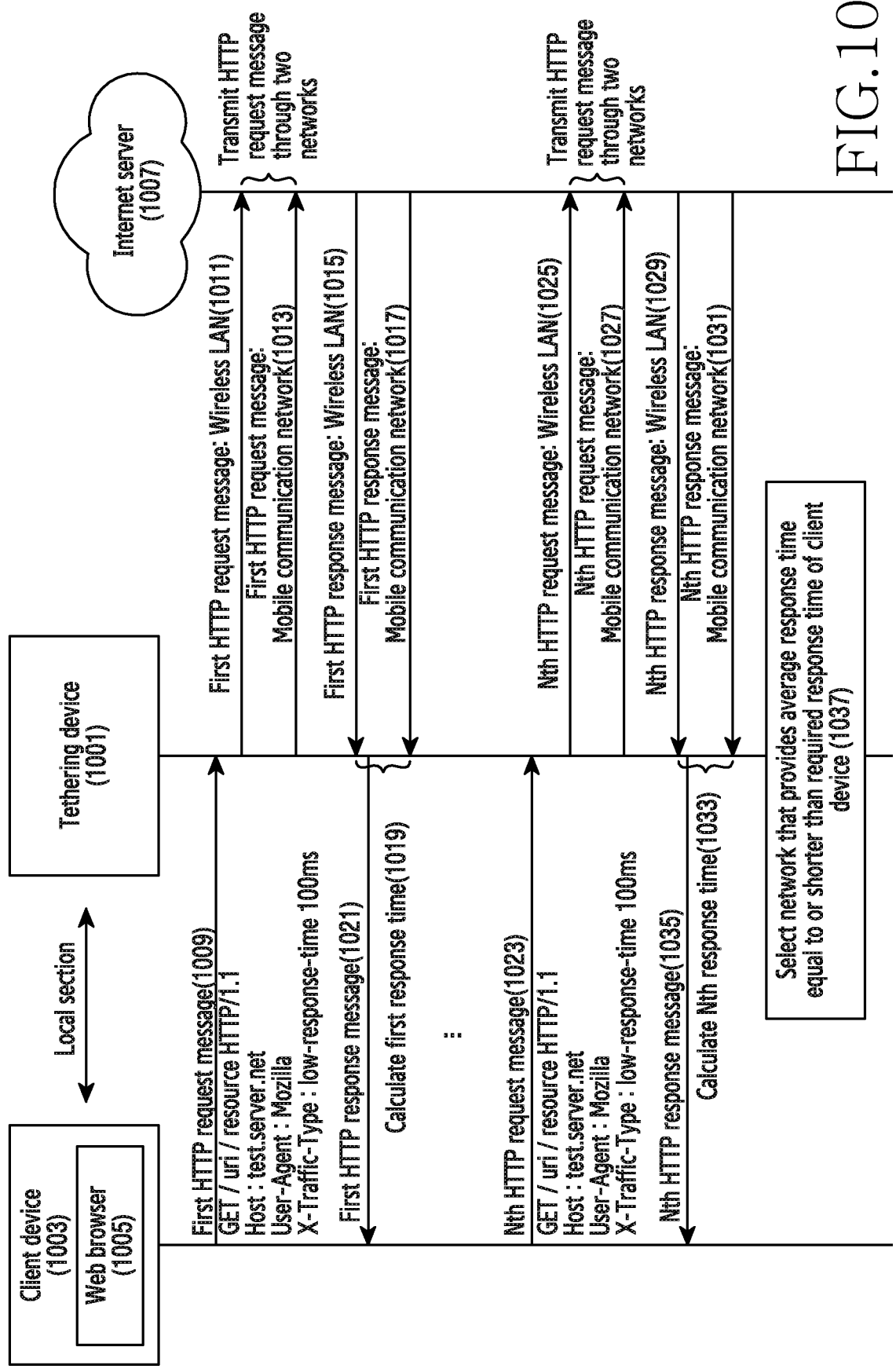
FIG. 10 illustrates an example of signal exchange by which the tethering device selects a network based on a response time according to an embodiment of the present invention.

FIG. 10 illustrates an example of signal exchange by which the tethering device selects a network based on a response time according to an embodiment of the present invention.

Referring to FIG. 10, a tethering device 1001 receives a first HTTP request message 1009 specifying a response time required by a client device 1003 from the client device 1003. For example, the response time may be expressed as "X-Traffic-Type: low-response-time 100 ms" in a header of the first HTTP request message 1009.

The tethering device 1001 transmits first HTTP request messages 1011 and 1013 received from the client device 1003 to an Internet server 1007 through the wireless LAN and the mobile communication network, respectively. The tethering device 1001 receives HTTP response messages 1015 and 1017 from the Internet server 1007 through the wireless LAN and the mobile communication network, respectively. The tethering device 1001 calculates a response time for the first HTTP response messages 1011 and 1013 received from the Internet server 1007 as indicated by a reference numeral 1019. That is, the tethering device 1001 may calculate a response time for each of the wireless LAN and the mobile communication network. The tethering device 1001 transmits a first HTTP response message 1021 received from the Internet server 1007 to the client device.

The tethering device 1001 receives an N$^{th}$ HTTP request message 1023 from the client device 1003. The tethering device 1001 transmits the N$^{th}$ HTTP request messages 1025 and 1027 to the Internet server 1007 through the wireless LAN and the mobile communication network, respectively. The tethering device 1001 receives HTTP response messages 1029 and 1031 from the Internet server 1007 through the wireless LAN and the mobile communication network, respectively.

The tethering device 1001 calculates a response time for the N$^{th}$ HTTP response messages 1029 and 1031 received through the wireless LAN and the mobile communication network, respectively, as indicated by a reference numeral 1033. The tethering device 1001 may calculate an average response time of each of the wireless LAN and the mobile communication network based on the first HTTP response messages 1015 and 1017 to the N$^{th}$ HTTP response messages 1029 and 1031 received through the wireless LAN and the mobile communication network, respectively. The tethering device 1001 transmits the N$^{th}$ HTTP request message 1035 from the client device 1003.

The tethering device 1001 selects a network that may provide a response time equal to or shorter than the response time required by the client device 1003, which is expressed in the HTTP request messages 1009 and 1123 received from the client device 1003 as indicated by a reference numeral 1037. For example, when the required response time in the HTTP request message received from the client device 1003 corresponds to "100 ms", the tethering device 1001 selects one network having the average response time equal to or shorter than "100 ms" between the wireless LAN and the mobile communication network as indicated by a reference numeral 1037. According to another embodiment of the present invention, when both the wireless LAN and the mobile communication network meet the response time condition, the tethering device 1001 may select the wireless LAN.

Figure 11:
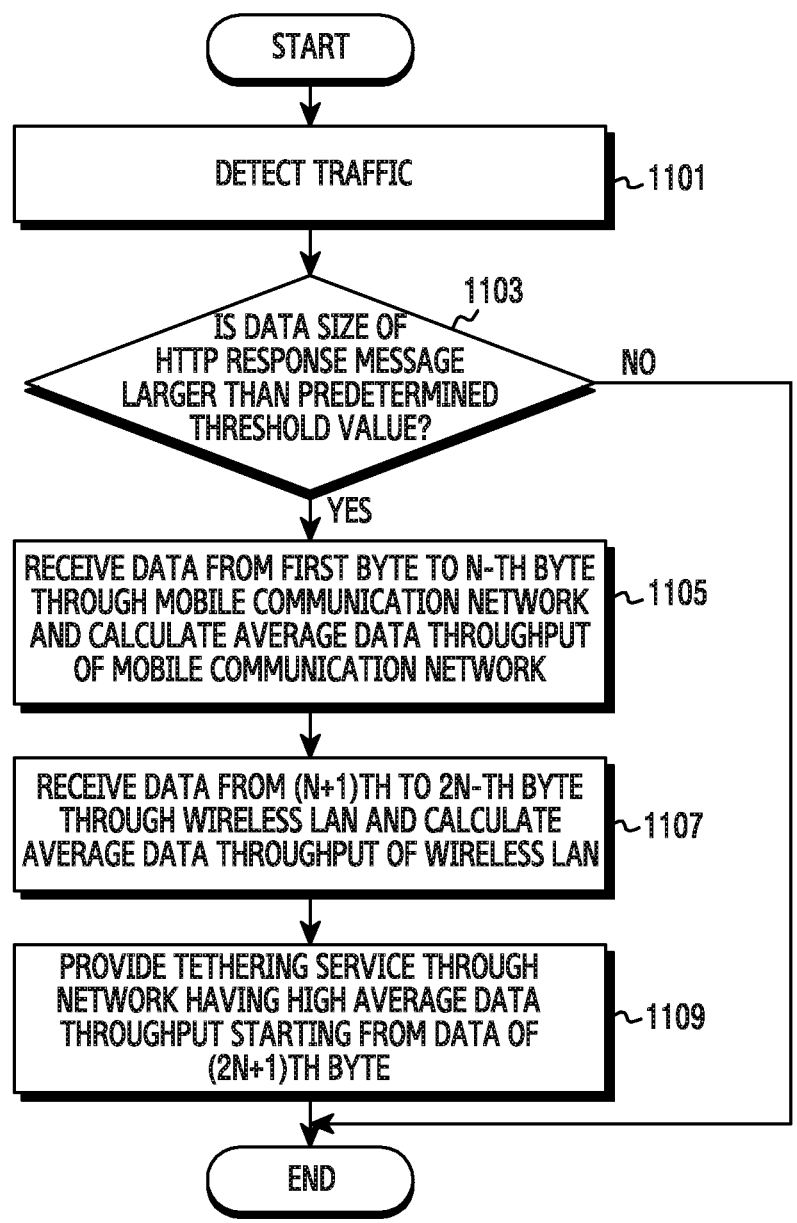
FIG. 11 illustrates an order in which the tethering device selects a network based on data throughput according to an embodiment of the present invention.

FIG. 11 is a flowchart illustrating an operation in which the tethering device selects a network based on data throughput according to an embodiment of the present invention.

Referring to FIG. 11, the tethering device detects traffic generated from the client device in step 1101. The tethering device may receive an HTTP request message from the client device and may transmit the HTTP request message to the Internet server. The tethering device may receive an HTTP response message from the Internet server in response to the HTTP request message.

The tethering device determines whether a data size of the HTTP response message received from the Internet server is larger than a predetermined threshold value in step 1103. According to an embodiment of the present invention, when the HTTP request message is a message for a data download, the Internet server may transmit a header of the HTTP request message including information on corresponding data or a corresponding file to the tethering device. The tethering device transmits the header of the HTTP response message to the client device. The data size may be expressed in a pre-appointed field of the header of the HTTP response message. The tethering device determines whether the data size expressed in the header of the HTTP response message is larger than the predetermined threshold value. When the data size is larger than the threshold value, the tethering device proceeds to step 1105.

The tethering device receives an HTTP response message including data from a first byte to an N$^{th}$ byte from the Internet server through the mobile communication network in step 1105. The tethering device calculates average data throughput of the mobile communication network based on the data from a first byte to an N$^{th}$ byte received through the mobile communication network.

The tethering device receives data from an N+1$^{th}$ byte to a 2N$^{th}$ byte from the Internet server through the wireless LAN in step 1107. The tethering device calculates average data throughput of the wireless LAN based on the data from the N+1$^{th}$ byte to the 2N$^{th}$ byte received from the Internet server through the wireless LAN.

The tethering device selects a network having higher average data throughput between the wireless LAN and the mobile communication network in step 1109. The tethering device may receive data from 2N+1 bytes received from the Internet server through the network having higher average data throughput between the wireless LAN and the mobile communication network. The tethering device may update previously measured state information of the wireless LAN and the mobile communication network based on the calculated average data throughput of the wireless LAN and the mobile communication network.

Figure 12A:
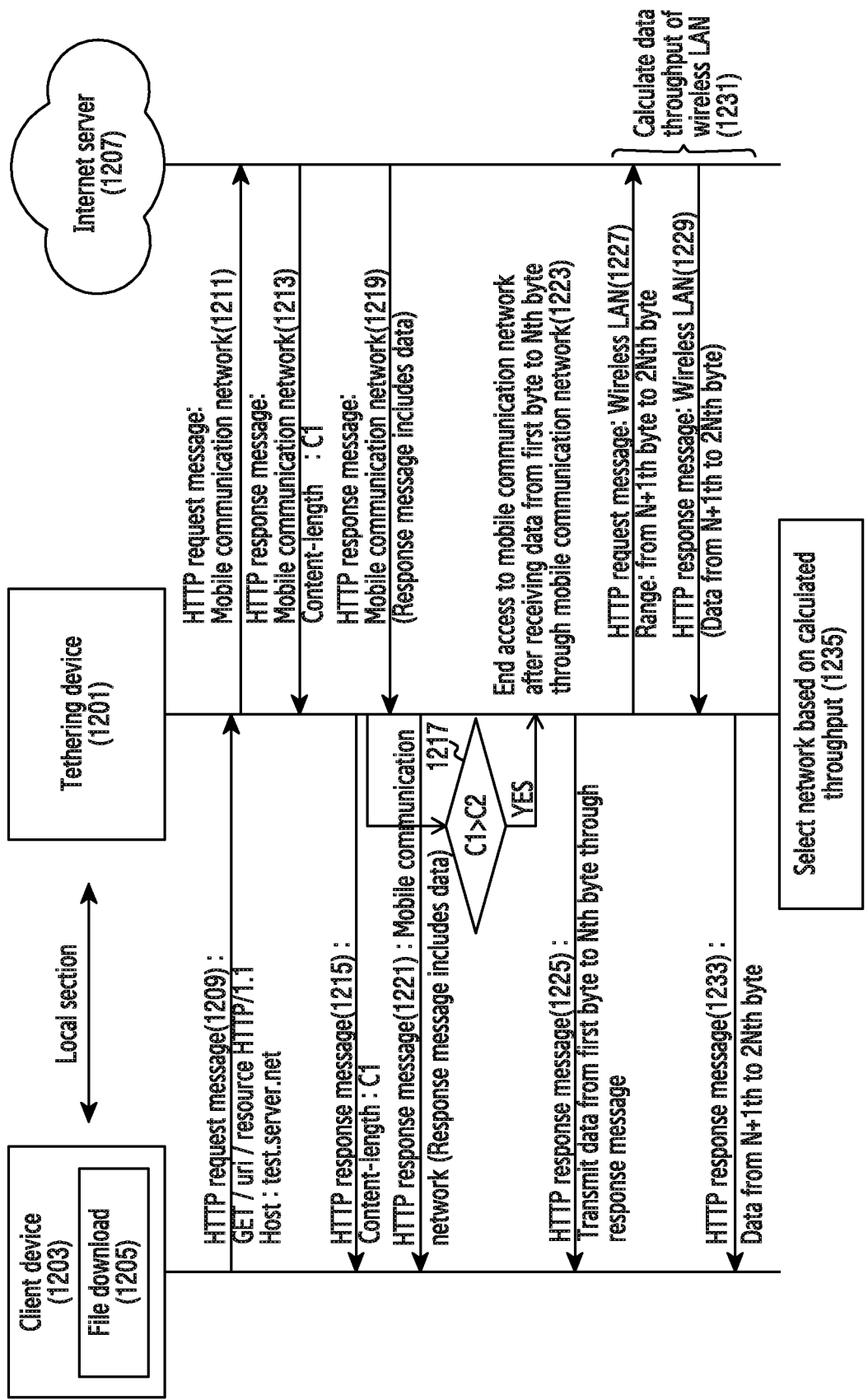
FIGS. 12A and 12B illustrate examples of signal exchange by which the tethering device selects a network based on data throughput according to an embodiment of the present invention.
Figure 12B:
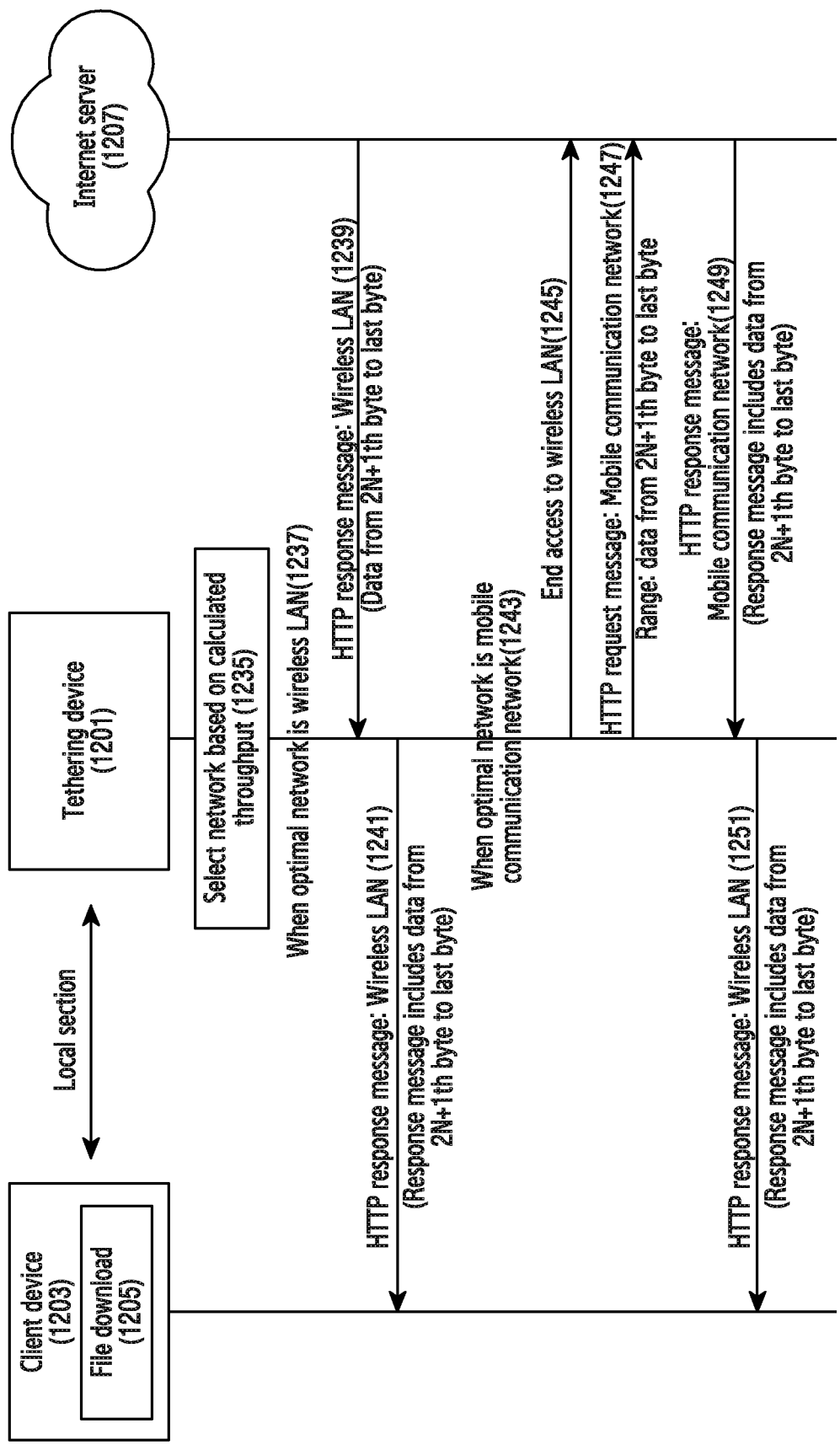

FIGS. 12A and 12B illustrate examples of signal exchange by which the tethering device selects a network based on data throughput according to an embodiment of the present invention.

Referring to FIG. 12A, a tethering device 1201 receives an HTTP request message 1209 from a client device 1203. For example, the tethering device 1201 may receive the HTTP request message 1209 for a file download 1205 from the client device 1203. The tethering device 1201 transmits the HTTP request message 1211 received from the client device 1201 to an Internet server 1207 through the mobile communication network. The Internet server 1207 transmits an HTTP response message 1213 for informing of a data size (or content length, c1) to the tethering device 1201 through the mobile communication network in response to the HTTP request message. The tethering device 1201 transmits the HTTP response message 1215 for informing of the data size to the client device 1203.

The tethering device 1201 determines whether the data size is larger than a predetermined threshold value (c2) in step 1217. When the data size (c1) is larger than the predetermined threshold value (c2), the tethering device 1201 receives an HTTP response message 1219 including data from a first byte to an $N^{th}$ (N≥1) byte from the Internet server 1207 through the mobile communication network. The tethering device 1201 transmits the HTTP response message 1221 including the data from the first byte to the $N^{th}$ byte to the client device 1203.

According to another embodiment of the present invention, the HTTP response message 1219 received from the Internet server 1207 may include a plurality of HTTP response messages having partitioned pieces of the data from the first byte to the $N^{th}$ (N≥1) byte rather than one message.

The tethering device 1201 calculates average data throughput of the mobile communication network based on the response message 1219. The tethering device 1201 transmits the HTTP response message 1221 to the client device 1203.

After receiving the HTTP response message including the data from the first byte to the $N^{th}$ byte from the Internet server 1207 through the mobile communication network, the tethering device 1201 ends the access to the mobile communication network as indicated by a reference numeral 1223. The tethering device 1201 transmits the HTTP response message 1225 to the client device 1203. The tethering device 1201 transmits an HTTP request message 1227 that makes a request for data from an $N+1^{th}$ byte to a $2N^{th}$ byte to the Internet server 1207 through the wireless LAN. The tethering device 1201 receives an HTTP response message 1229 including the data from the $N+1^{th}$ byte to the $2N^{th}$ byte from the Internet server 1207 through the wireless LAN in response to the HTTP request message 1227. The tethering device 1201 transmits an HTTP response message 1233 including the data from the $N+1^{th}$ byte to the $2N^{th}$ byte to the client device 1203.

According to another embodiment of the present invention, the HTTP response message may include a plurality of HTTP response messages including partitioned data from the $N+1^{th}$ byte to the $2N^{th}$ byte rather than one message. The tethering device 1201 may sequentially receive the plurality of HTTP response messages from the Internet server 1207. Further, the tethering device 1201 may sequentially transmit the plurality of HTTP request messages to the client device 1203.

The tethering device 1201 calculates data throughput of the wireless LAN based on an HTTP response message 1229 received from the Internet server 1207 through the wireless LAN as indicated by a reference numeral 1231. The tethering device 1201 selects a network having higher data throughput between the mobile communication network and the wireless LAN based on data throughput of the mobile communication network and data throughput of the wireless LAN as indicated by a reference numeral 1235.

Referring to FIG. 12B, the tethering device 1201 selects a network based on data throughput as indicated by a reference numeral 1235. The tethering device 1201 may select one network having higher data throughput between the wireless LAN and the mobile communication network.

When the data throughput of the wireless LAN is higher than the data throughput of the mobile communication network as indicated by a reference numeral 1237, the tethering device 1201 selects the wireless LAN. The tethering device 1201 receives an HTTP response message 1239 including data from a $2N+1^{th}$ byte to the last byte from the Internet server 1207 through the wireless LAN.

According to another embodiment of the present invention, the HTTP response message 1239 received from the Internet server 1207 may include a plurality of HTTP response messages including partitioned data from the $2N+1^{th}$ byte to the last byte rather than one message.

The tethering device 1201 transmits the HTTP response message 1241 including the data from the $2N+1^{th}$ byte to the last byte to the client device. According to another embodiment of the present invention, the tethering device 1201 may transmit the plurality of HTTP response messages received from the Internet server 1207 to the client device 1203 according to an order received from the Internet server 1207.

When the data throughput of the mobile communication network is higher than the data throughput of the wireless LAN as indicated by a reference numeral 1243, the tethering device 1201 may end the access to the wireless LAN as indicated by a reference numeral 1245 and may access the mobile communication network. The tethering device 1201 transmits an HTTP request message 1247 to the Internet server 1207 through the mobile communication network. The HTTP request message 1247 may include an indication of a range of data to be received by the tethering device 1201. For example, the HTTP request message 1247 may include an indication of a request for transmission of the data from the $2N+1^{th}$ byte to the last byte. The tethering device 1201 receives an HTTP response message 1249 including the data from the $2N+1^{th}$ byte to the last byte from the Internet server 1207 through the mobile communication network. The tethering device 1201 transmits the HTTP response message 1251 to the client device 1203.

FIG. 13 illustrates an example of signal exchange by which the tethering device simultaneously uses different communication schemes according to an embodiment of the present invention.

The tethering device 1301 may determine priorities of a plurality of client devices. In other words, the tethering device 1301 may determine at least one client device having a high priority among the plurality of client devices. The tethering device 1301 may provide a tethering service by using both the wireless LAN and the mobile communication network for at least one client device having the high priority.

Referring to FIG. 13, the tethering device 1301 receives an HTTP request message 1309 from the client device 1303. The HTTP request message 1309 may include information on data to be received by the client device 1303. The tethering device 1301 transmits the HTTP request message 1311 received from the client device 1303 to the Internet server 1307 through the wireless LAN. The tethering device 1301 receives a header 1313 of an HTTP response message including an indication of a data size (C1) from the Internet server 1307 through the wireless LAN in response to the HTTP request message 1311. For example, the data size (C1) may be expressed by "Content-length: C1" in the header.

The tethering device 1301 transmits the header 1315 of the HTTP response message received from the Internet server 1307 through the wireless LAN to the client device 1303. The Internet server 1307 transmits an HTTP response message 1317 including the data in response to the HTTP request message received from the tethering device 1301. The tethering device 1301 transmits the HTTP response message 1319 including the data received from the Internet server 1307 to the client device 1303.

The tethering device 1301 receives an HTTP response message 1321 including data from 1 byte to N bytes from the Internet server 1307 through the wireless LAN. The tethering device 1301 transmits the HTTP response message 1323 including the data from the first byte to the $N^{th}$ byte received from the Internet server 1307 to the client device 1303.

The tethering device 1301 calculates throughput (S1) of the data received from the Internet server 1307 through the wireless LAN as indicated by a reference numeral 1325. The tethering device 1301 calculates throughput (S2) of the data transmitted to the client device 1303 as indicated by a reference numeral 1327. That is, the tethering device 1301 may calculate data throughput of the network connected to the Internet server 1307 and data throughput of the network connected to the client device 1303.

The tethering device 1301 determines whether the priority is assigned to the client device 1303 and whether the data throughput (S2) of the network through which the tethering device 1301 is connected to the client device 1303 is larger than the data throughput (S1) of the network through which the tethering device 1301 is connected to the Internet server 1307 as indicated by a reference numeral 1329. When the priority is assigned to the client device 1303 and the data throughput (S2) of the network connected to the client device 1303 is larger than the data throughput (S1) of the network connected to the Internet server 1307, the tethering device 1301 transmits an HTTP request message 1333 through the mobile communication network. In other words, when the priority of the client device 1303 is high and the data throughput of the network connected to the client device 1303 is larger than the data throughput of the network connected to the Internet server 1307, the tethering device 1301 may provide a tethering service to the client device 1303 by simultaneously using the wireless LAN and the mobile communication network. The HTTP request message 1333 may include an indication of a data range that makes a request for data from an $N+1^{th}$ byte to the last byte (C1).

Figure 14:
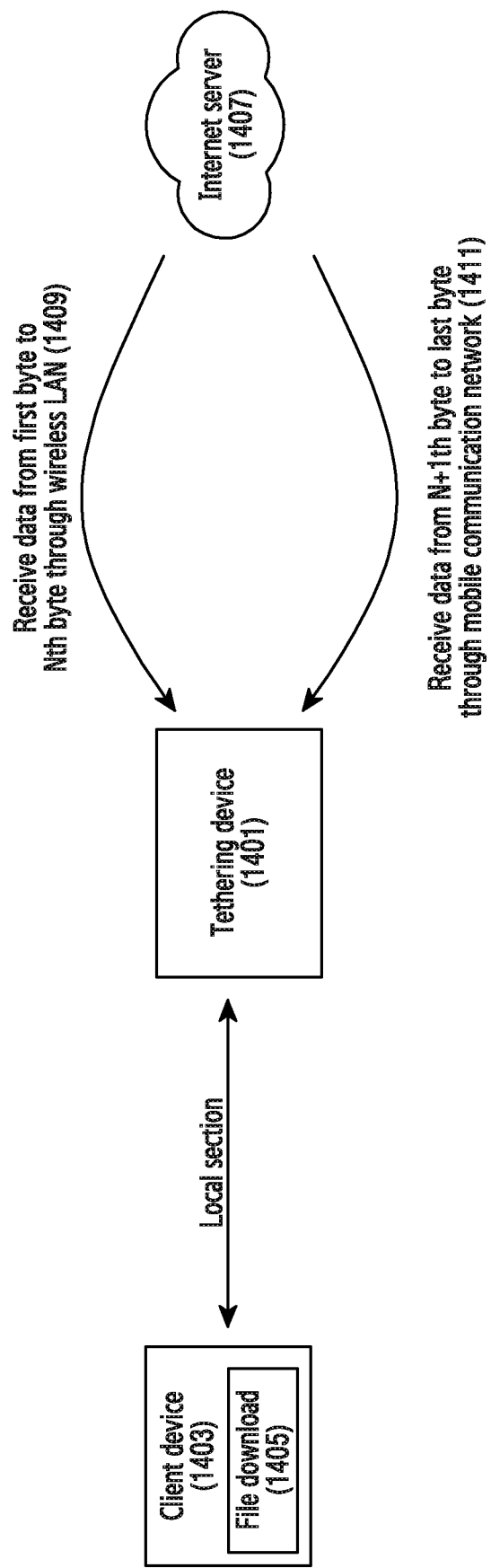
FIG. 14 illustrates an example in which the tethering device provides a tethering service to the client device by simultaneously using different communication schemes according to an embodiment of the present invention.

FIG. 14 illustrates an example in which the tethering device provides a tethering service to the client device by simultaneously using different communication schemes according to an embodiment of the present invention.

Referring to FIG. 14, when a priority of a client device 1403 is high, a tethering device 1401 may calculate the data throughput of a network through which the tethering device 1401 is connected to the client device 1403 and data throughput of a network through which the tethering device 1401 is connected to an Internet server 1407.

When the data throughput of the network through which the tethering device 1401 is connected to the client device 1403 is larger than the data throughput of the network through which the tethering device 1401 is connected to the Internet server 1407, the tethering device 1401 may provide the tethering service to the client device 1403 by simultaneously using the wireless LAN and the mobile communication network as indicated by reference numerals 1409 and 1411. For example, when the tethering device 1401 downloads a file from the Internet server 1407, the tethering device 1401 may receive a part of the file through the wireless LAN as indicated by the reference numeral 1409 and may receive the remaining parts of the file through the mobile communication network as indicated by the reference numeral 1411. For example, when the data size of the file is 2N bytes, the tethering device 1401 may receive data from a first byte to an $N^{th}$ byte (1<N<2N) from the Internet server 1407 through the wireless LAN as indicated by the reference numeral 1409 and may receive data from an $N+1^{th}$ byte to an $2N^{th}$ byte through the mobile communication network as indicated by the reference numeral 1411.

Figure 15:
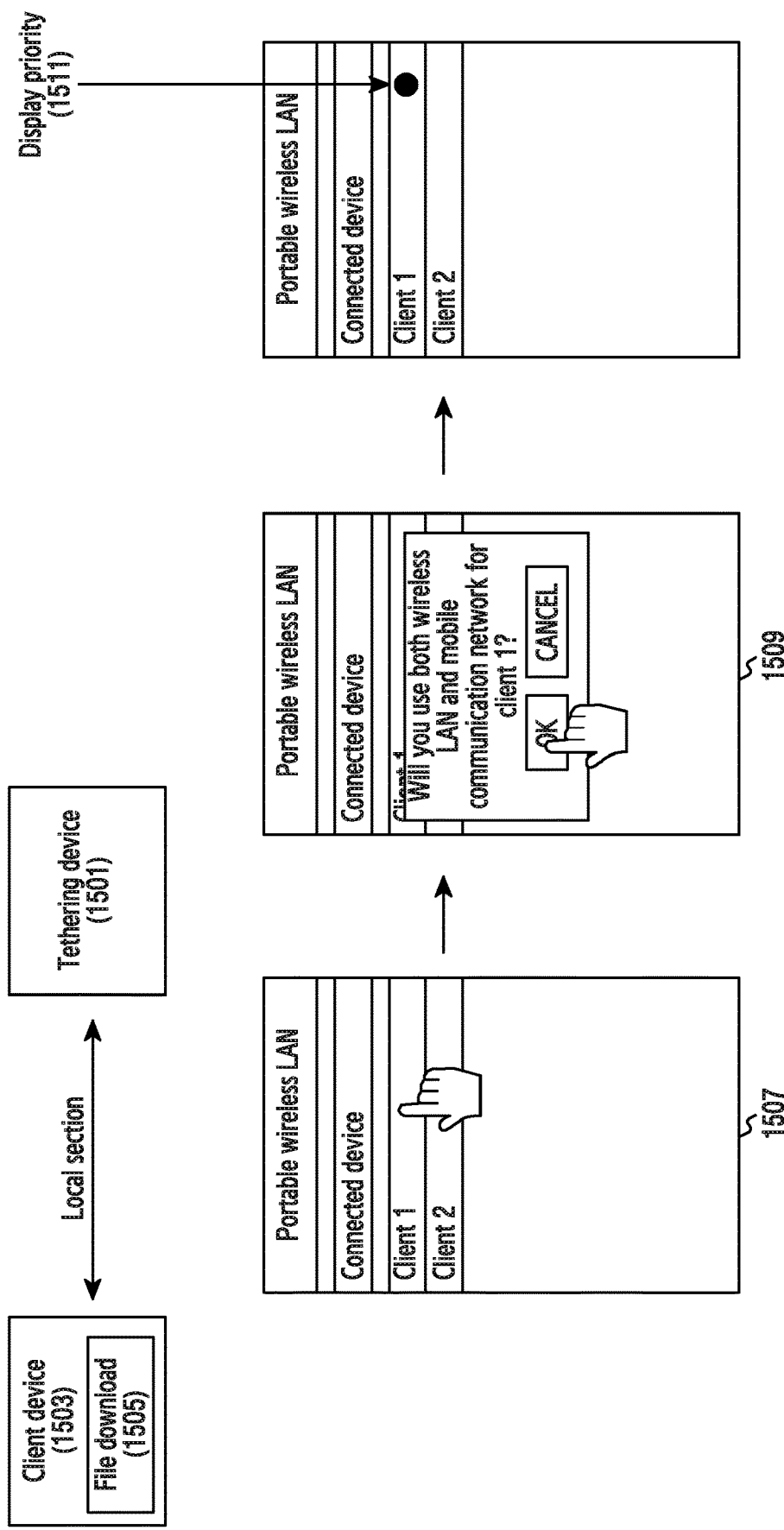
FIG. 15 illustrates an example in which the tethering device determines a priority of at least one client device according to an embodiment of the present invention.

FIG. 15 illustrates an example in which the tethering device determines a priority of at least one client device according to an embodiment of the present invention.

Referring to FIG. 15, a tethering device 1501 may determine a priority of at least one client device 1503 to which the tethering device 1501 may provide a tethering service. For example, when the tethering device 1501 is connected to two client devices, the tethering device 1501 may determine a priority of at least one of the two client devices. For example, when a user of the tethering device 1501 selects one client device through a user interface (for example, a touch screen) of the tethering device 1501 as indicated by a reference numeral 1507, the tethering device 1501 may display a message that inquires the user about whether to simultaneously use the wireless LAN and the mobile communication network for the one selected client device as indicated by a reference numeral 1509. When the user determines to simultaneously use the wireless LAN and the mobile communication network for the one selected client device, the tethering device 1501 may display that a priority is assigned to the one client device as indicated by a reference numeral 1511.

Figure 16:
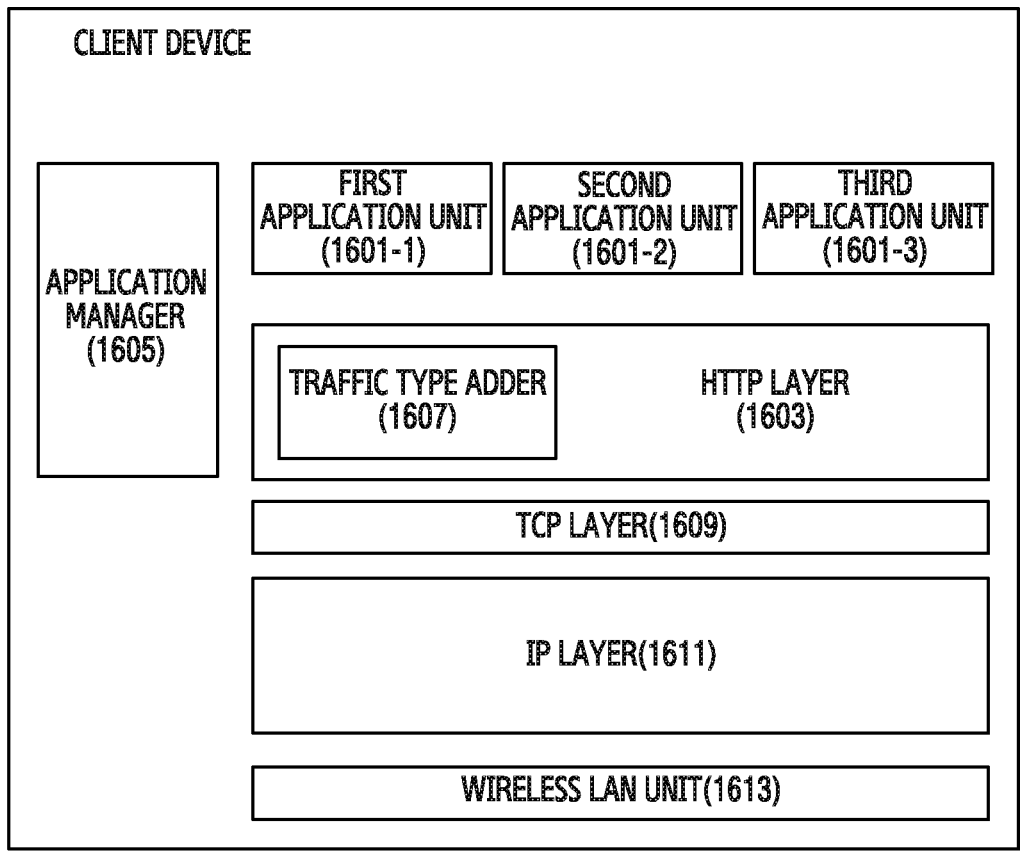
FIG. 16 illustrates an example of a block diagram of the client device according to an embodiment of the present invention.

FIG. 16 illustrates an example of a block diagram of the tethering device according to an embodiment of the present invention.

Referring to FIG. 16, at least one of applications 1601-1, 1601-2, and 1601-3 of the tethering device may transfer an HTTP request message to an HTTP layer 1603. The HTTP layer 1603 may identify the application to which the HTTP request message has been transferred among the applications 1601-1, 1601-2, and 1601-3. An application manager 1605 may know whether the applications 1601-1, 1601-2, and 1601-3 are executed in the foreground or the background as a function provided by an operating system of the tethering device. A traffic type adder 1607 may determine a traffic characteristic of the HTTP request message by using the HTTP request message received through at least one of the applications 1601-1, 1601-2, and 1601-3. A TCP layer 1609 is a layer that controls transmission on the Internet and guarantees transmission, such as guaranteeing a loss during transmission. An IP layer 1611 is a layer that performs addressing and routing to transfer a packet. The IP layer 1611 serves to transfer data received from the TCP layer 1609 to a destination. The addressing refers to assigning an ID or an IP address to transfer data to the destination by the IP layer 1611. The routing refers to searching for a route through the assigned IP address to transfer data to the destination by the IP layer 1611. A wireless LAN unit 1613 is a short range communication network that may use high-speed Internet within a predetermined range in which a radio access device is installed, and may use a radio wave or an infrared transmission scheme. The wireless LAN unit 1613 may include at least one of a Wi-Fi mobile, a Bluetooth module, a Wi-Fi direct module, and a wireless gigabit alliance module.

Figure 17:
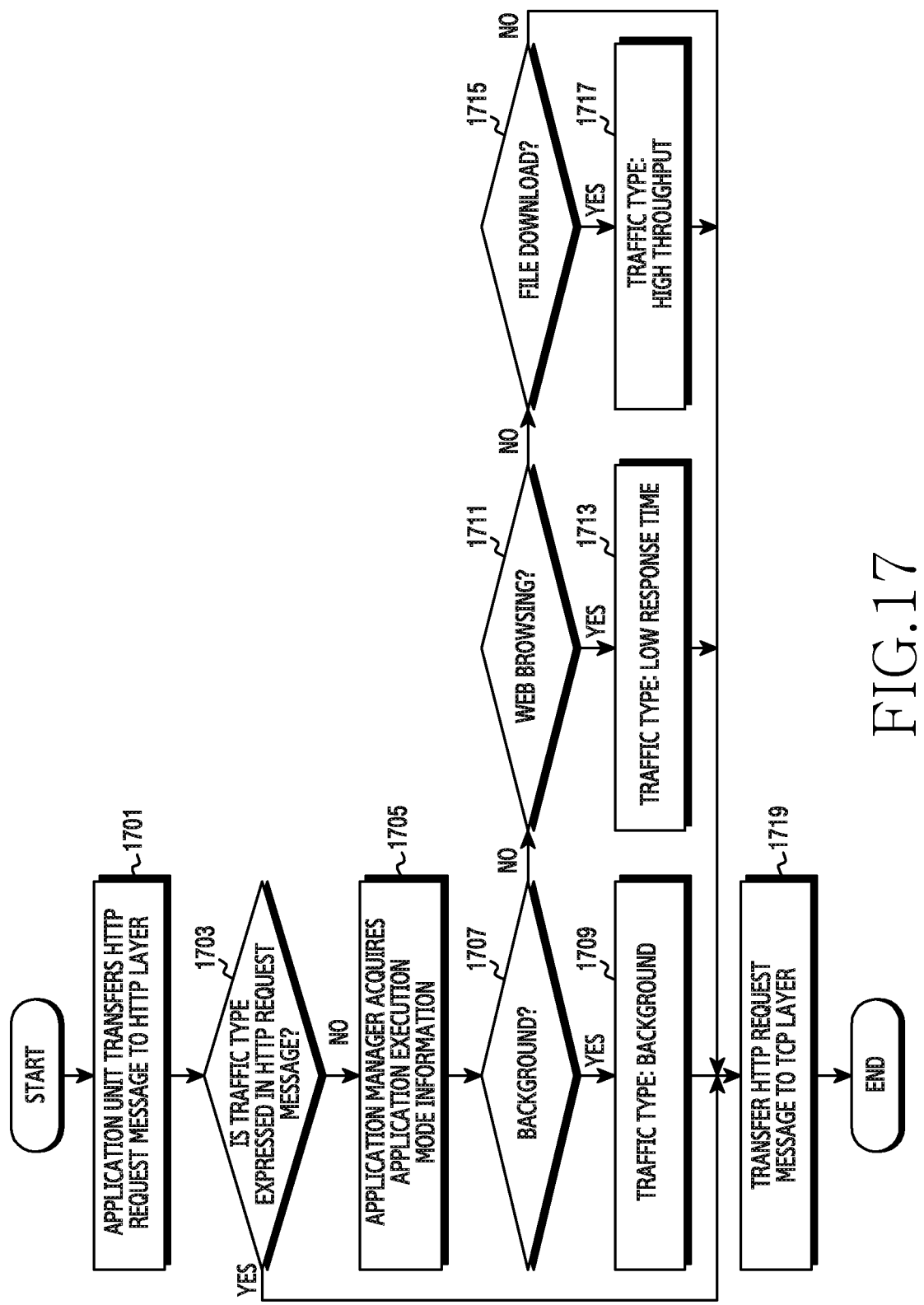
FIG. 17 illustrates an order in which the tethering device determines a traffic characteristic according to an embodiment of the present invention.

FIG. 17 is a flowchart illustrating an operation in which the tethering device determines a traffic characteristic according to an embodiment of the present invention.

Referring to FIG. 17, the tethering device transfers an HTTP request message generated by an application unit to an HTTP layer in step 1701. The tethering device identifies whether a traffic characteristic is included in the HTTP request message in step 1703. When the traffic characteristic is included in the HTTP request message, the tethering device proceeds to step 1719.

When the traffic characteristic is not included in the HTTP request message, the tethering device identifies information on an execution mode of the application from an application manager in step 1705. The tethering device may identify whether the application is executed in the background or the foreground through the application manager.

The tethering device may determine if the application is executed in the background in step 1707. When the application is executed in the background, the tethering device determines the traffic characteristic as the "background" in step 1709. According to an embodiment of the present invention, the traffic characteristic may be expressed as "X-traffic-type: background" in a header of the HTTP request message.

When the application is not executed in the background, the tethering device determines whether the traffic corresponds to traffic for web browsing in step 1711. When the traffic corresponds to the traffic for web browsing, the tethering device determines the traffic characteristic as a "low response time" in step 1713. According to an embodiment of the present invention, the traffic characteristic may be expressed as "X-traffic-type: low response time" in the header of the HTTP request message. According to another embodiment of the present invention, a required response time as well as the traffic characteristic may be expressed in the header of the HTTP request message. For example, "X-traffic-type: low response time 100 ms" may be expressed in the header of the HTTP request message.

When the traffic does not correspond to the traffic for web browsing, the tethering device identifies whether the traffic corresponds to traffic for a file download in step 1715. When the traffic corresponds to the traffic for the file download, the tethering device determines the traffic characteristic as "high throughput" in step 1717. According to an embodiment of the present invention, the traffic characteristic may be expressed as "X-traffic-type: high throughput" in the header of the HTTP request message. According to another embodiment of the present invention, required data throughput as well as the traffic characteristic may be expressed in the header of the HTTP request message. For example, "X-traffic-type: high throughput 1 Mbps" may be expressed in the header of the HTTP request message.

When the traffic does not correspond to the traffic for the file download, the tethering device proceeds to step 1719. The tethering device transfers the HTTP request message to the TCP layer in step 1719.

Figure 18:
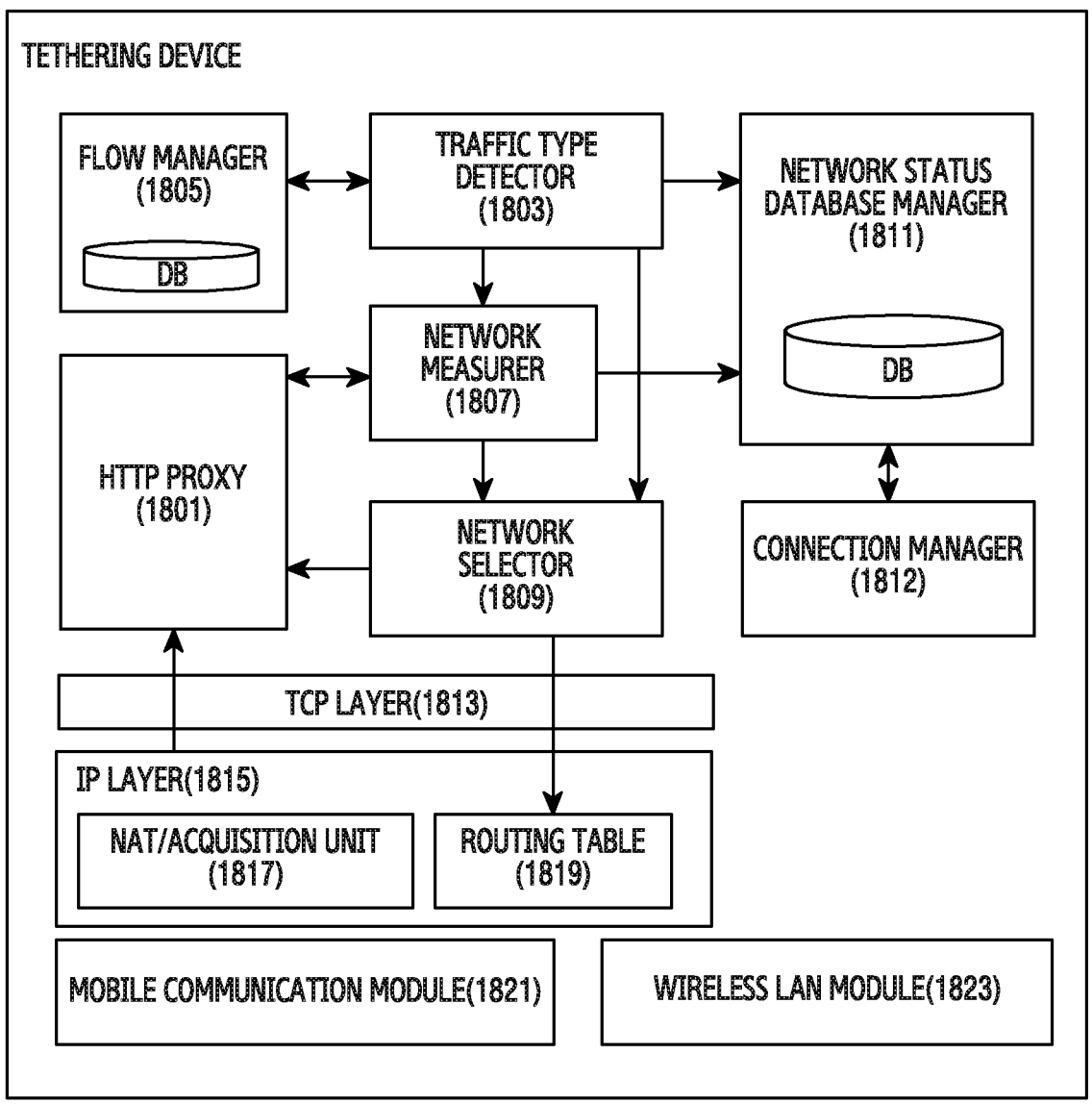
FIG. 18 illustrates an example of a block diagram of the tethering device according to an embodiment of the present invention.

FIG. 18 illustrates another example of the block diagram of the tethering device according to an embodiment of the present invention.

Referring to FIG. 18, an HTTP proxy 1801 of the tethering device may serve to transfer an HTTP request message received from at least one client device to a server. The HTTP proxy 1801 may transfer an HTTP response message received from the server to the client device. The HTTP proxy 1801 transmits the HTTP request message to the Internet server and receives the HTTP response message from the Internet server to measure data throughput of the wireless LAN or the mobile communication network according to a request from a network estimator 1807.

A traffic type detector 1803 may extract information on a traffic characteristic from the HTTP request message. The traffic type detector 1803 may transfer the extracted information on the traffic characteristic to a flow manager 1805. The traffic type detector 1803 may receive information on whether the HTTP request message is the same as a previously received HTTP request message from the flow manager 1805. When the HTTP request message is the same as the previously received HTTP request message, the traffic type detector 1803 may transfer a message that makes a request for transmitting the HTTP request message to the server through the mobile communication network to a network selector 1809 even though there is no connection to the wireless LAN. When a new HTTP request message is received from the tethering device, the traffic type detector 1803 may inform a network status database manager 1811 of the reception of the new HTTP request message.

The flow manager 1805 may store the HTTP request message. The flow manager 1805 may identify whether the received HTTP request message is the same as a previously received HTTP request message.

A network measurer 1807 measures a response time and data throughput of the wireless LAN and the mobile communication network based on the HTTP request message and the HTTP response message transmitted and received through the wireless LAN and the mobile communication network by the HTTP proxy 1801, respectively. The network measurer 1807 may transfer a result of the measurement of the response time and the data throughput to the network status database manager 1811.

The network selector 1809 may select at least one of the wireless LAN and the mobile communication network based on at least one of the response time or the data throughput of the wireless LAN or the mobile communication network measured by the network measurer 1807 and the response time of the data throughput of the wireless LAN or the mobile communication network stored in the network status database manager 1811. The network selector 1809 may set a routing table 1819 to transmit the HTTP request message to the server through at least one selected network.

The network status database manager 1811 may store information on a connection state of the wireless LAN and the mobile communication network, the response time of the wireless LAN and the mobile communication network, and the data throughput of the wireless LAN and the mobile communication network. The network status database manager 1811 may receive a new HTTP request message through the traffic type detector 1803. When the connection with at least one of the wireless LAN and the mobile communication network is disconnected, the network status database manager 1811 performs the connection with at least one of the wireless LAN and the mobile communication network through a connection manager 1812. The network status database manager 1811 may receive a connection state of at least one of the wireless LAN and the mobile communication network from the connection manager 1812. A TCP layer 1813 is a layer that controls transmission on the Internet and guarantees transmission, such as guaranteeing a loss during transmission. An NAT (Network Address Translation)/interceptor unit 1817 performs a function of, when a connector accesses the server, changing an IP address and acquiring a packet to transfer the packet to the proxy. A routing table 1819 refers to a table including information on a next hop to arrive the destination based on the IP address. A mobile communication module 1821 may refer to a module that may receive a communication service through access to a network provided by a mobile communication service provider. A wireless LAN module 1823 refers to a short range communication network that may use high-speed Internet within a predetermined range in which a radio access device is installed and may use a radio wave or an infrared transmission scheme.

Figure 19:
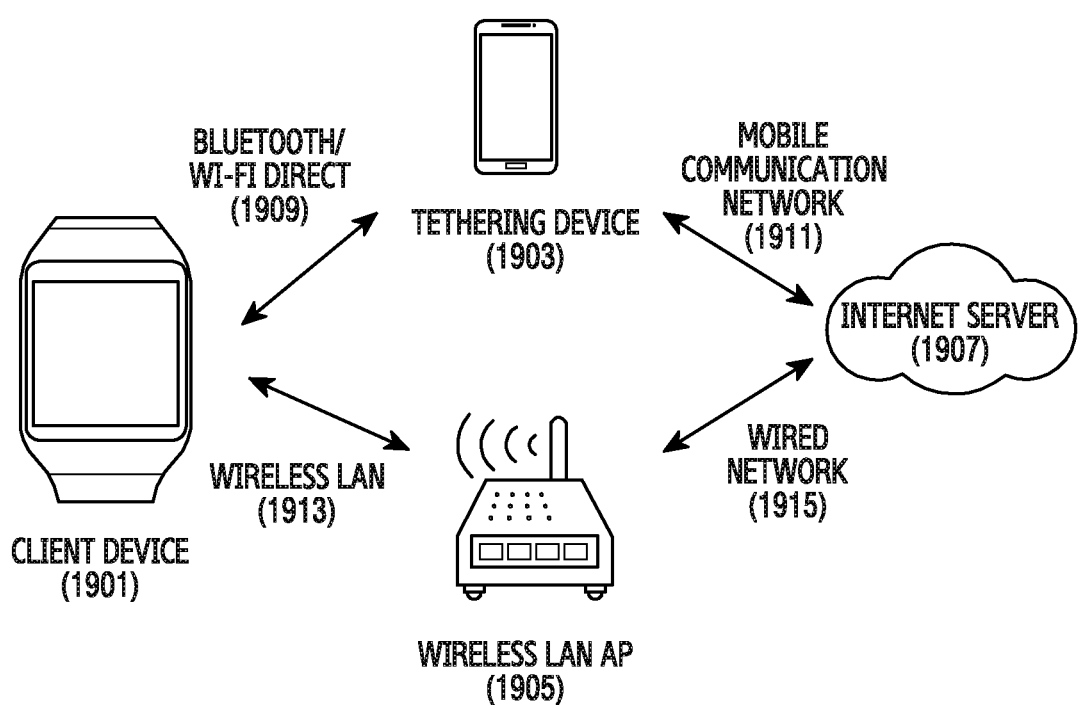
FIG. 19 illustrates another example of the communication environment of the tethering device and the client device according to an embodiment of the present invention.

FIG. 19 illustrates another example of a communication environment of the tethering device and the client device according to an embodiment of the present invention.

Referring to FIG. 19, a client device 1901 may receive data from an Internet server 1907 through a wireless LAN Access Point (AP) 1905 as well as the tethering device 1903. For example, the client device 1901 may receive data required to be secured through the tethering device 1903 and may receive data that is not required to be secured through the wireless LAN AP 1905. The tethering device 1903 may receive the data required to be secured from an Internet server 1907 through a mobile communication network 1911. The tethering device 1903 may transmit the data required to be secured, which has been received from the Internet server 1907, to the client device 1901 through a Bluetooth or a Wi-Fi direct scheme. According to another embodiment of the present invention, the tethering device 1903 may communicate with the client device 1901 through a short range communication scheme as well as the Bluetooth or the Wi-Fi direct scheme. The wireless LAN AP 1905 may receive the data, which is not required to be secured, from the Internet server 1907 through a wired network 1915. The wireless LAN AP 1905 may transmit the data, which is not required to be secured, received from the Internet server 1907 to the client device 1901 through the wireless LAN 1913.

Figure 20:
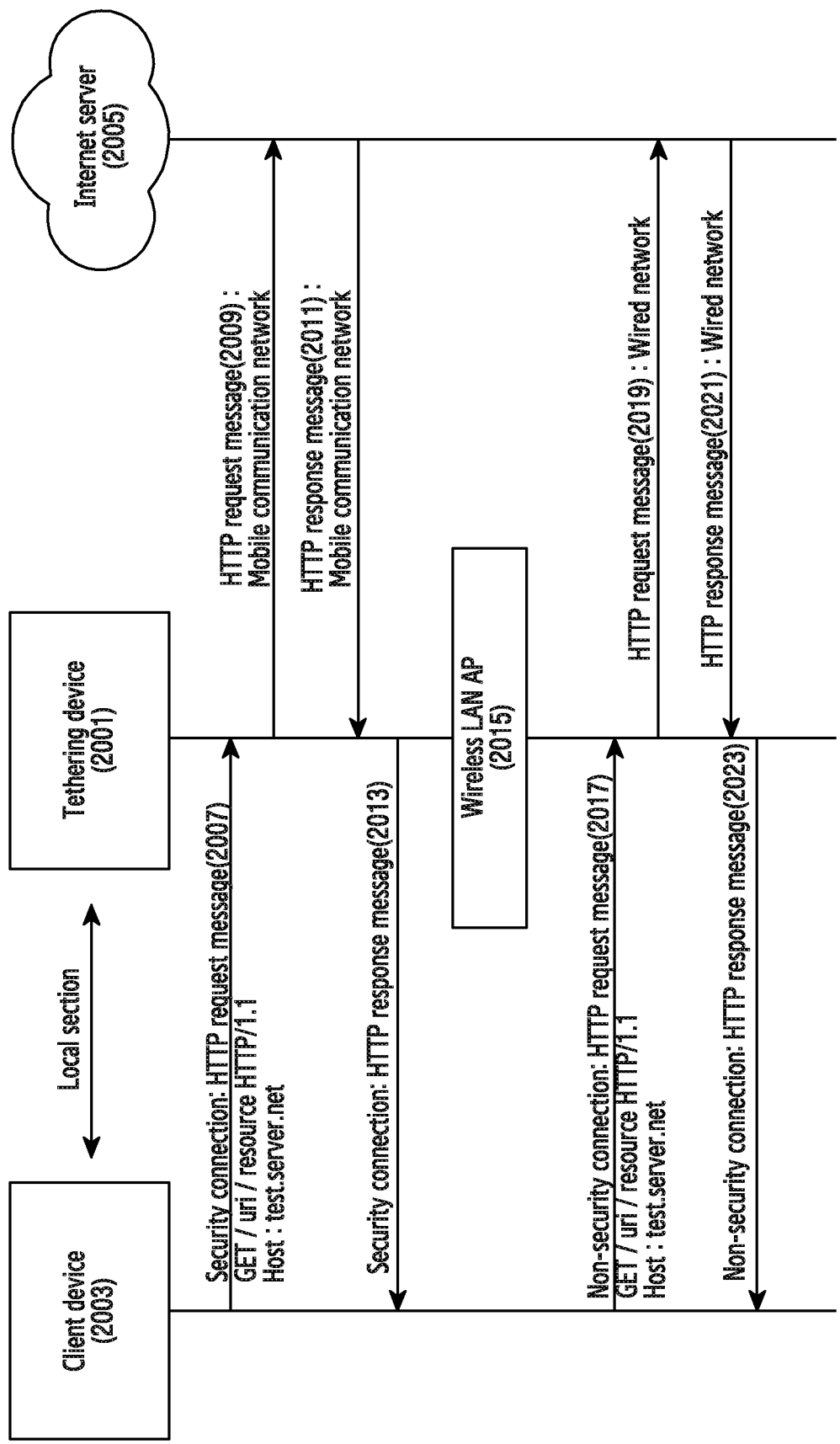
FIG. 20 illustrates an example of signal exchange for security connection or non-security connection of the tethering device according to an embodiment of the present invention.

FIG. 20 illustrates an example of signal exchange for a security connection or a non-security connection of the tethering device according to an embodiment of the present invention.

Referring to FIG. 20, when transmitting and receiving data required to be secured, a client device 2003 transmits an HTTP request message 2007 to a tethering device 2001. The tethering device 2001 transmits the HTTP request message 2009 received from the client device 2007 to an Internet server 2005 through the mobile communication network. The tethering device 2001 receives an HTTP response message 2011 from the Internet server 2005 through the mobile communication network. The tethering device 2001 transmits the HTTP response message 2013 received from the Internet server 2005 to the client device 2003.

According to an embodiment of the present invention, when transmitting and receiving data, which is not required to be secured, the client device 2003 transmits an HTTP request message 2017 to a wireless LAN AP 2015. The wireless LAN AP 2015 transmits the HTTP request message 2019 received from the client device 2003 to the Internet server 2005 through a wired network. The Internet server 2005 transmits an HTTP response message 2021 to the wireless LAN AP 2015 through the wired network. The wireless LAN AP 2015 transmits the HTTP response message 2023 received from the Internet server 2005 to the client device 2003.

Figure 21:
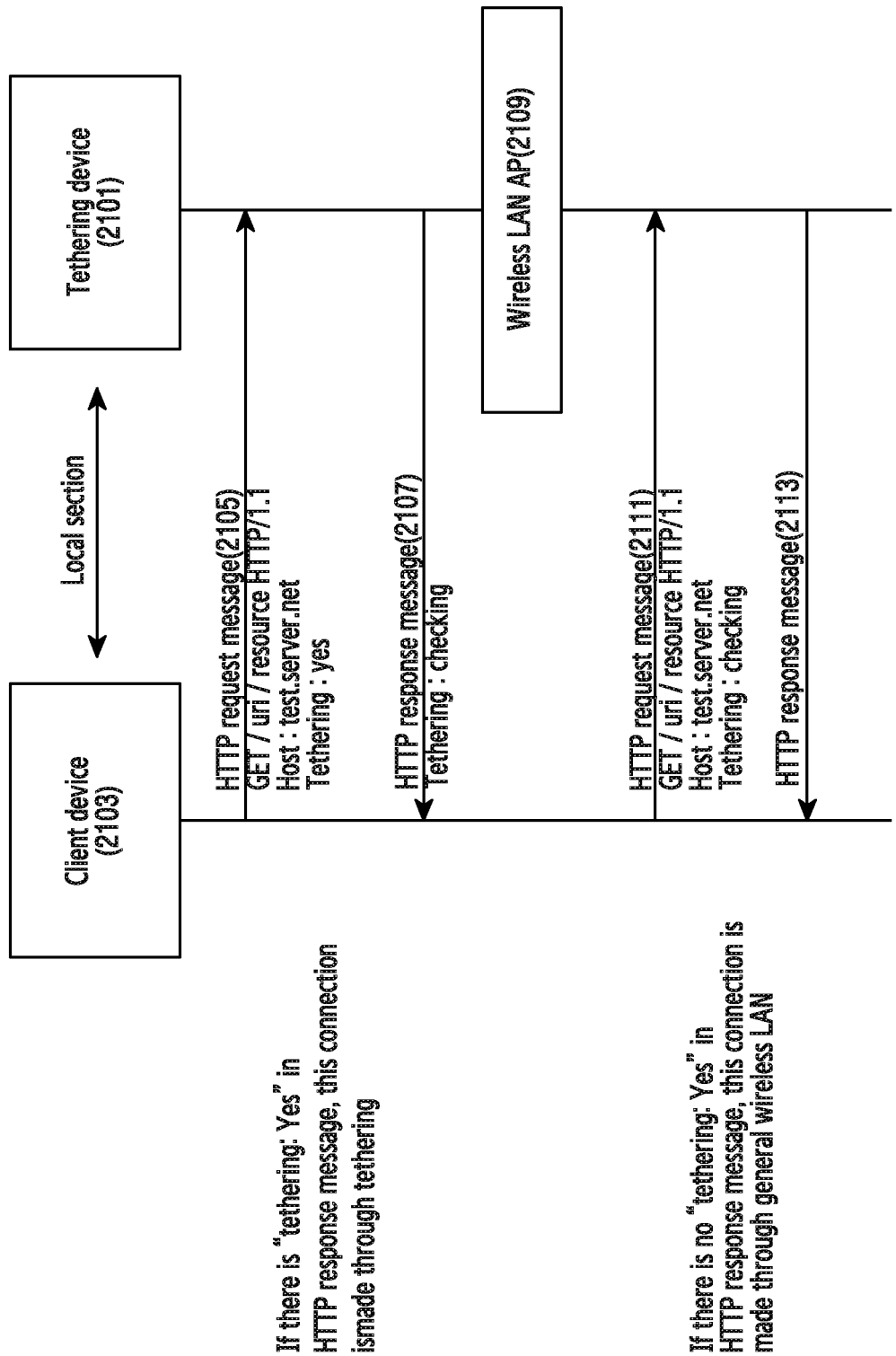
FIG. 21 illustrates an example of signal exchange by which the tethering device identifies a tethering connection according to an embodiment of the present invention.

FIG. 21 illustrates an example of signal exchange by which the tethering device identifies a tethering connection according to an embodiment of the present invention.

Referring to FIG. 21, a client device 2013 connected to a tethering device 2101 in a local section may identify whether the connection with the tethering device 2101 is a general connection or a tethering connection. For example, the client device 2103 may insert an indication to identify the tethering connection in an HTTP request message transmitted to the tethering device 2101. For example, the client device 2103 transmits an HTTP request message 2105 including an indication of "Tethering: checking" that makes a request for identifying the tethering connection to the tethering device 2101. When the connection with the client device 2103 is the tethering connection, the tethering device 2101 may insert an indication to inform that connection is the tethering connection in an HTTP response message transmitted to the client device 2103. For example, when the connection is the tethering connection, the tethering device 2101 transmits an HTTP response message 2107 including an indication of "Tethering: yes" to the client device 2103.

According to another embodiment of the present invention, when the connection is not the tethering connection, the client device 2103 may receive an HTTP response message which does not include the indication of "Tethering: yes". For example, the client device 2103 transmits an HTTP request message 2111 including the indication of "Tethering: checking" to a wireless LAN AP 2109 to inquire about whether the tethering connection has been made. At this time, when the connection between the client device 2103 and the wireless LAN AP 2109 is not the connection for the tethering connection, the wireless LAN AP 2109 transmits an HTTP response message 2113 which does not include the indication of "Tethering: yes" indicating the tethering connection to the client device. According to another embodiment of the present invention, the indication for identifying the tethering connection may be expressed through another type instead of "Tethering: checking" or "Tethering: yes".

Figure 22:
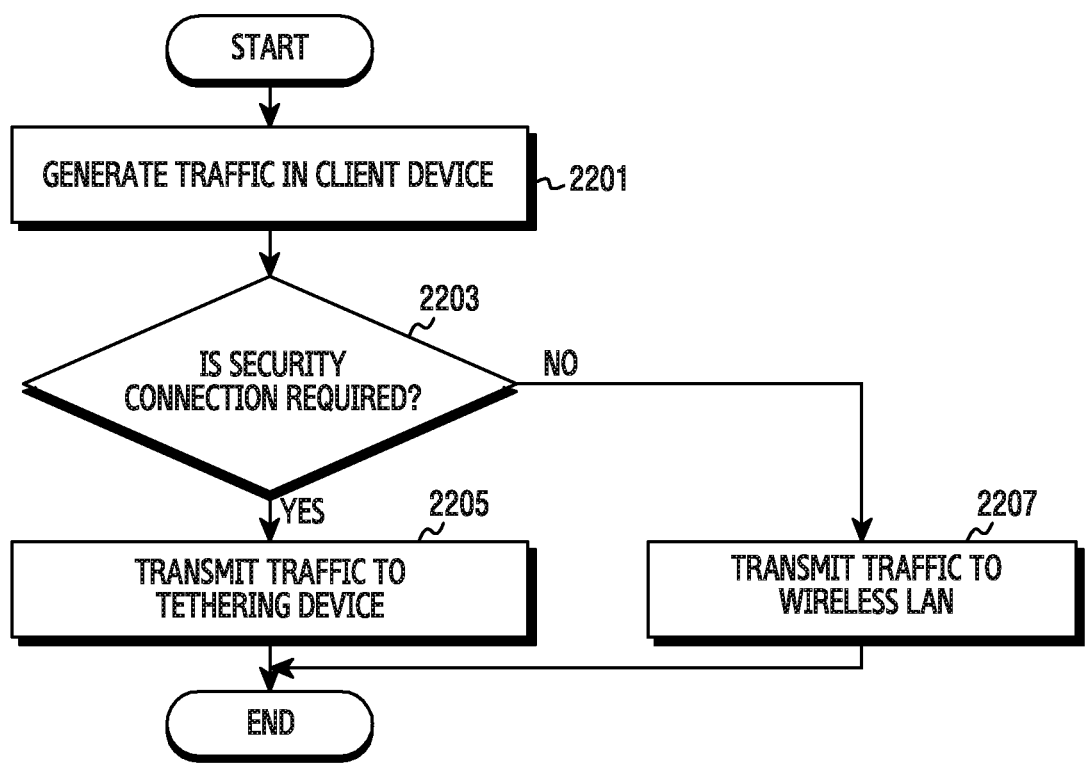
FIG. 22 illustrates another example of the communication environment of the tethering device and the client device according to an embodiment of the present invention.

FIG. 22 is a flowchart illustrating an operation of a security connection of the client device according to an embodiment of the present invention.

Referring to FIG. 22, the client device generates traffic that makes a request for data in step 2201. The traffic may be an HTTP request message including information on data requested by the client device.

The client device determines whether the traffic is traffic requiring the security connection in step 2203. When the traffic requires the security connection, the client device transmits the traffic to the tethering device in step 2205. When the traffic does not require the security connection, the client device transmits the traffic to the wireless LAN AP in step 2207.

Figure 23A:
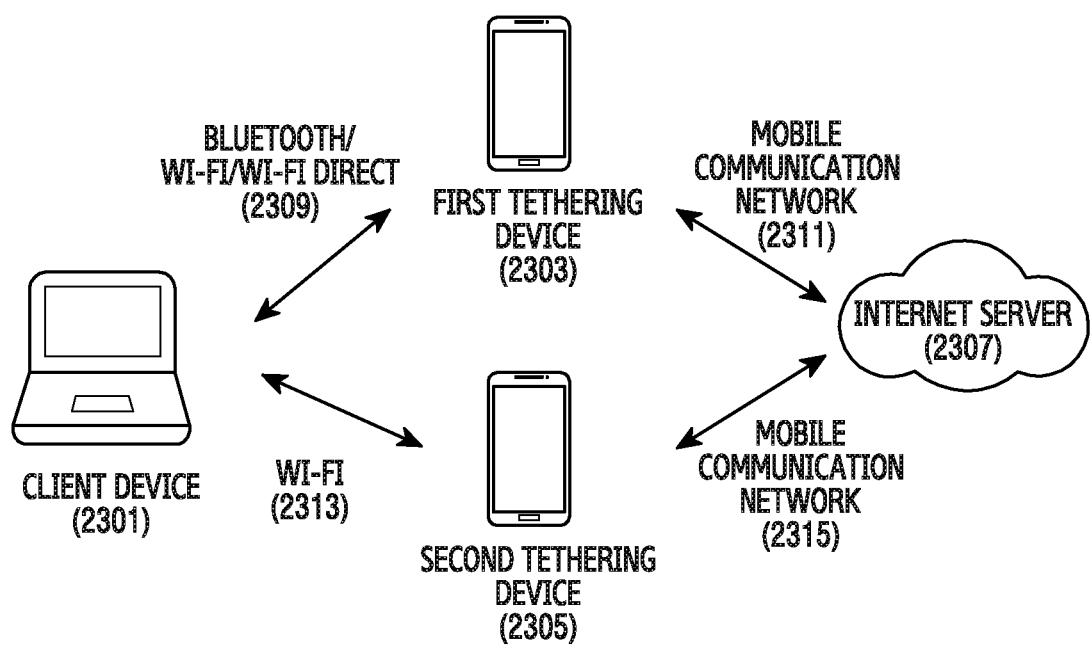
FIGS. 23A and 23B illustrate another example of the communication environment of the tethering device and the client device according to an embodiment of the present invention.
Figure 23B:
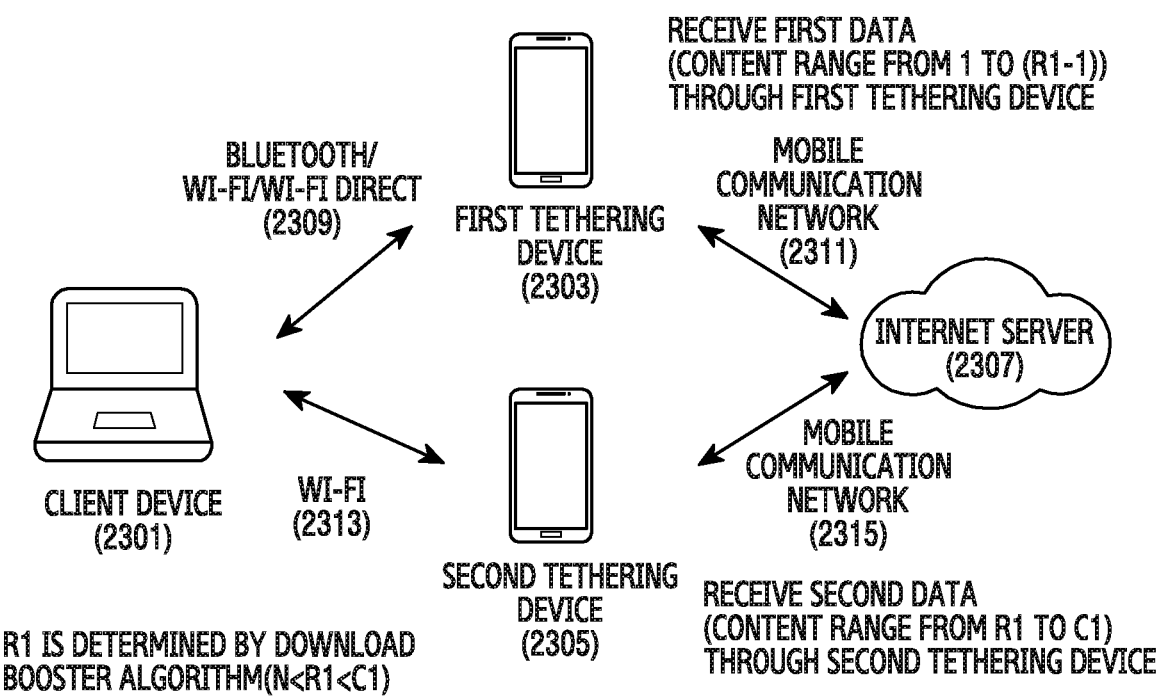

FIGS. 23A and 23B illustrates another example of the communication environment of the tethering device and the client device according to an embodiment of the present invention.

Referring to FIG. 23A, a client device 2301 may receive a tethering service through a plurality of different tethering devices. For example, the client device 2301 may receive data from an Internet server 2307 through two different tethering devices 2303 and 2305. For example, the first tethering device 2303 and the second tethering device 2305 may receive data from the Internet server 2307 according to a request of the client device 2301. The first tethering device 2303 and the second tethering device 2305 may transmit the data received from the Internet server 2307 to the client device 2301.

The first tethering device 2303 and the second tethering device 2305 may receive the data from the Internet server 2307 through mobile communication networks 2311 and 2315, respectively. The first tethering device 2303 and the second tethering device 2305 may transmit the data received from the Internet server 2307 to the client device 2301 through a Bluetooth, a Wi-Fi, or a Wi-Fi direct scheme. A communication connection between the tethering devices 2303 and 2305 and the client device 2301 may be made through a short range communication scheme which is not the Bluetooth, the Wi-Fi, or the Wi-Fi direct scheme.

Referring to FIG. 23B, the client device 2301 may receive a part of the data requested by the client device 2301 through the first tethering device 2303. Further, the client device 2301 may receive the remaining data except for the part of the data through the second tethering device 2305. For example, the client device 2301 may receive first data having a content range from 1 to R1−1 among contents having a total content range of C1 through the first tethering device 2303. Further, the client device 2301 may receive second data having a content range from R1 to C1 through the second tethering device 2305. According to an embodiment of the present invention, the content range may be determined by the client device 2301.

According to another embodiment of the present invention, the client device 2301 may receive different types of data through the different tethering devices 2303 and 2305, respectively, rather than partitively receiving one successive data through the different tethering devices 2303 and 2305. For example, the client device 2301 may receive a music file from the first tethering device 2303 and receive a video file from the second tethering device 2305.

Figure 24:
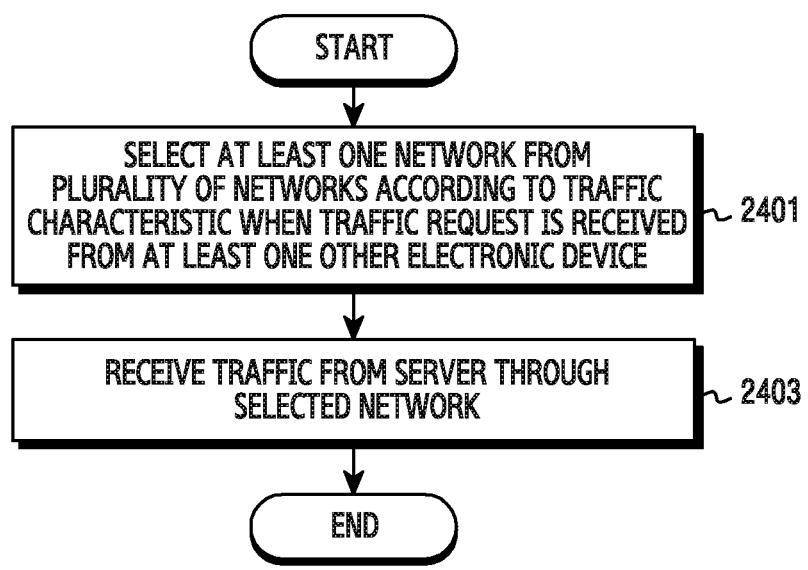
FIG. 24 illustrates an example of a flowchart illustrating an operation of an electronic device according to an embodiment of the present invention.

FIG. 24 illustrates an example of a flowchart for an operation of an electronic device according to an embodiment of the present invention.

When a traffic request is received from at least one other electronic device, the electronic device selects at least one network from a plurality of networks according to a characteristic of the traffic in step 2401. The traffic characteristic may include at least one of a response time and throughput. The traffic request may include information on the response time or the throughput. The information on the response time or the throughput may be information differently set according to an application executed in the other electronic device. The plurality of networks may include at least one of a wireless LAN and a cellular network.

The electronic device may select at least one network further based on network status information on each of the plurality of networks. The network status information may include at least one of the previously measured response time and throughput of each of the plurality of networks. When the traffic is first traffic that does not care if a fast response time or high throughput is not guaranteed, the electronic device may select a first network having the highest cost from the plurality of networks. The electronic device may identify whether the electronic device is connected to the first network. When the traffic request is made by a number of times larger than a predetermined number of times and an attempt of the connection to the first network is not successful, the electronic device may select a second network. When the traffic is second traffic requiring a fast response, the electronic device may select one network that provides a fast response time from the plurality of networks. When the traffic is third traffic requiring high throughput, the electronic device may select one network that provides the highest throughput from the plurality of networks.

The electronic device may make a request for a part of the traffic to the server through each of the plurality of networks, receive the requested part of the traffic, and measure a response time or throughput of each of the plurality of networks. When an average response time measured for at least one selected network exceeds a previously measured average response time, the electronic device may select at least one network that provides the fastest response time from the plurality of networks again. When a traffic request is received from an electronic device receiving a priority among at least one other electronic device, the electronic device may select two or more networks from the plurality of networks. When data throughput between the electronic device and the other electronic device having the priority is higher than data throughput between the electronic device and the server, the electronic device may select two or more networks. The priority may be set by the user.

The electronic device receives the traffic from the server through the selected network in step 2403. When the electronic device is connected to the first network, the electronic device may receive the traffic from the server through the first network. When the electronic device is not connected to the first network, the electronic device may attempt the connection to the first network. When the attempt of the connection is successful, the electronic device may receive the traffic from the server through the first network. When the attempt of the connection is not successful, the electronic device may transmit an error message to at least one other electronic device. When a size of the traffic received from the server is larger than a predetermined threshold value, the electronic device may partitively receive parts of the traffic through the plurality of networks, respectively. The electronic device may receive the remaining parts of the traffic through a network having the highest average throughput for the partitively received parts of the traffic among the plurality of networks.

Figure 25:
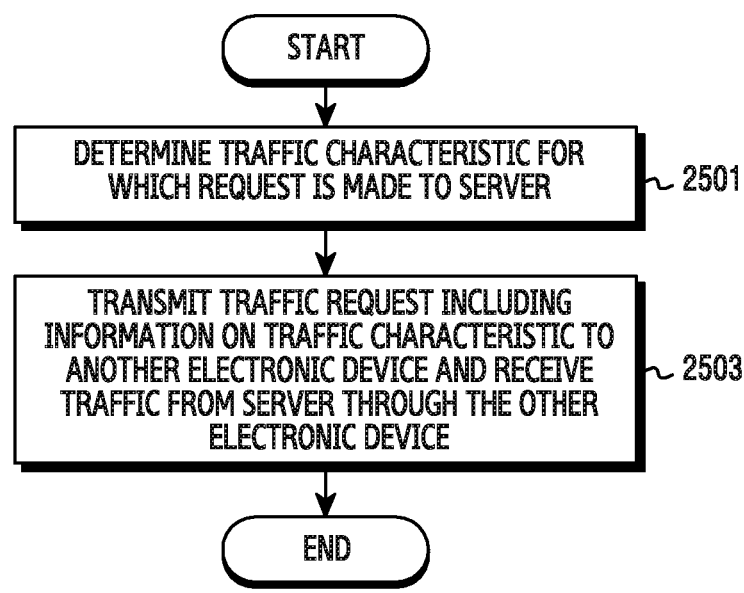
FIG. 25 illustrates another example of a flowchart illustrating an operation of the electronic device according to an embodiment of the present invention.

FIG. 25 illustrates another example of the flowchart for the operation of the electronic device according to an embodiment of the present invention.

The electronic device determines a characteristic of traffic for which a request is made to the server in step 2501. The electronic device may determine the traffic characteristic based on an application execution mode. The electronic device may generate the traffic request including information on the traffic characteristic. The application execution mode may include at least one of a background mode, a web browsing mode, and a file download mode.

The electronic device transmits the traffic request including the information on the traffic characteristic to another electronic device and receives the traffic from the server through the other electronic device in step 2503. The traffic may include at least one of first traffic that does not care if a fast response time or high throughput is not guaranteed, second traffic requiring a fast response time, and third traffic requiring high throughput.

Figure 26:
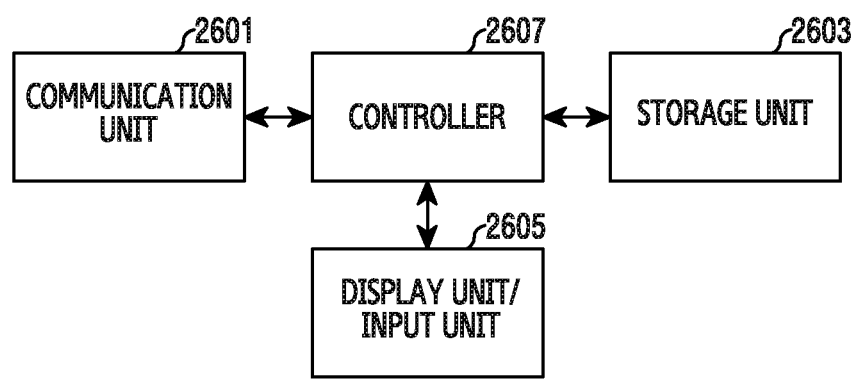
FIG. 26 illustrates an example of a block diagram of the electronic device according to an embodiment of the present invention.

FIG. 26 illustrates an example of a block diagram of the electronic device according to an embodiment of the present invention.

Referring to FIG. 26, a communication unit 2601, a storage unit 2603, a display unit/input unit 2605, and a controller 2607 are illustrated.

The communication unit 2601 performs a function of transmitting and receiving a radio signal of data input and output through an antenna. For example, the communication unit 2601 performs a function of channel coding, RF (Radio Frequency) processing, and then transmitting data to be transmitted in a case of transmission, and performs a function of converting a received RF signal into a baseband signal, channel decoding the baseband signal, and thus reconstructing the data in a case of reception.

In addition to the typical function, the communication unit 2601 may receive the traffic from the server through the selected network according to an embodiment of the present invention. When the electronic device is connected to a first network, the communication unit 2601 may receive the traffic from the server through the first network. When the electronic device is not connected to the first network, the communication unit 2601 may attempt the connection to the first network and, when the attempt of the connection is successful, may receive the traffic from the server through the first network. When the attempt of the connection is not successful, the communication unit 2601 may transmit an error message to at least one other electronic device. When a size of the traffic received from the server is larger than a predetermined threshold value, the communication unit 2601 may partitively receive parts of the traffic through the plurality of networks, respectively. The communication unit 2601 may receive the remaining parts of the traffic through a network having the highest average throughput for the partitively received parts of the traffic among the plurality of networks.

The communication unit 2601 according to another embodiment of the present invention may transmit a traffic request including information on the traffic characteristic to another electronic device. The communication unit 2601 may receive the traffic from the server through the other electronic device.

The storage unit 2603 stores micro codes of a program for processing and control of the controller 2605 and various pieces reference data. Particularly, according to an embodiment of the present invention, the storage unit 2603 may store at least one of a response time and data throughput for each of a plurality of networks measured by the electronic device.

The display unit/input unit 2605 may include a touch screen that provides an input/output interface between the electronic device and the user. The display unit/input unit 2605 may provide an interface for a user's touch input/output. More specifically, the display unit/input unit 2605 may be a medium that transfers the user's touch input to the electronic device and shows an output from the electronic device to the user. Further, the display unit/input unit 2605 may provide a visual output to the user. For example, the display unit/input unit 2605 may output an image of a device recognized by a camera of the electronic device. Such a visual output appears in the form of a text, a graphic, a video, or a combination thereof. The display unit/input unit 2605 may use various display techniques. For example, the display unit/input unit 2605 may use an LCD (Liquid Crystal Display), a LED (Light Emitting Diode), an LPD (Light emitting Polymer Display), an OLED (Organic Light Emitting Diode), an AMOLED (Active Matrix Organic Light Emitting Diode), or a FLED (Flexible LED). The touch screen of the display unit/input unit 2605 according to the present invention is not limited to a touch screen using the display technique.

The display unit/input unit 2605 according to an embodiment of the present invention may display a UI (User Interface) through which the user may set a priority of at least one other electronic device. According to another embodiment of the present invention, the display unit/input unit 2605 may not be included in the electronic device.

The controller 2607 controls the general operation of the electronic device. For example, the controller 2607 performs processing and control for voice communication and data communication.

In addition to the typical function, according to an embodiment of the present invention, when a traffic request is received from at least one other electronic device, the controller 2607 may select at least one network from a plurality of networks according to a traffic characteristic. The plurality of networks may include at least one of a wireless LAN and a cellular network. The traffic characteristic may include at least one of a response time and throughput. The traffic request may include information on the response time and the throughput. The information on the response time and the throughput may be information differently set according to an application executed in the other electronic device. The controller 2607 may select at least one network further based on network status information of each of the plurality of networks. The network status information may include at least one of the previously measured response time and throughput of the plurality of networks.

When the traffic is first traffic that does not care if a fast response time of high throughput is not guaranteed, the controller 2607 may select a first network having the highest cost from the plurality of networks. Among the plurality of networks, the network having the highest cost refers to a network having the lowest cost or a network having no cost when network access is performed. The controller 2607 may identify whether the electronic device is connected to the first network. When the traffic request is generated by a number of times larger than a predetermined number of times and an attempt of the connection to the first network is not successful, the controller 2607 may select a second network. When the traffic is second traffic requiring a fast response, the controller 2607 may select one network that provides the fastest response time among the plurality of networks. When the traffic is third traffic requiring high throughput, the controller 2607 may select one network that provides the highest throughput among the plurality of networks.

The controller 2607 may make a request for a part of the traffic to the server through each of the plurality of networks, receive the requested part of the traffic, and measure a response time and throughput of each of the plurality of networks. When an average response time measured for at least one selected network exceeds a previously measured average response time, the controller 2607 may select at least one network that provides the fastest response time again from the plurality of networks. When a traffic request is received from an electronic device receiving a priority among at least one other electronic device, the controller 2607 may select two or more networks from the plurality of networks. When data throughput between the electronic device and the other electronic device receiving the priority is larger than data throughput between the electronic device and the server, the controller 2607 may select two or more networks. The priority may be set by the user.

The controller 2607 according to another embodiment of the present invention may determine a characteristic of the traffic for which a request is made to the server. The controller 2607 may determine the traffic characteristic based on an application execution mode. The controller 2607 may generate the traffic request including information on the traffic characteristic. The application execution mode may include at least one of a background mode, a web browsing mode, and a file download mode. The traffic may include at least one of first traffic that does not care if a fast response time or high throughput is not guaranteed, second traffic requiring a fast response time, and third traffic requiring high throughput.

Figure 27:
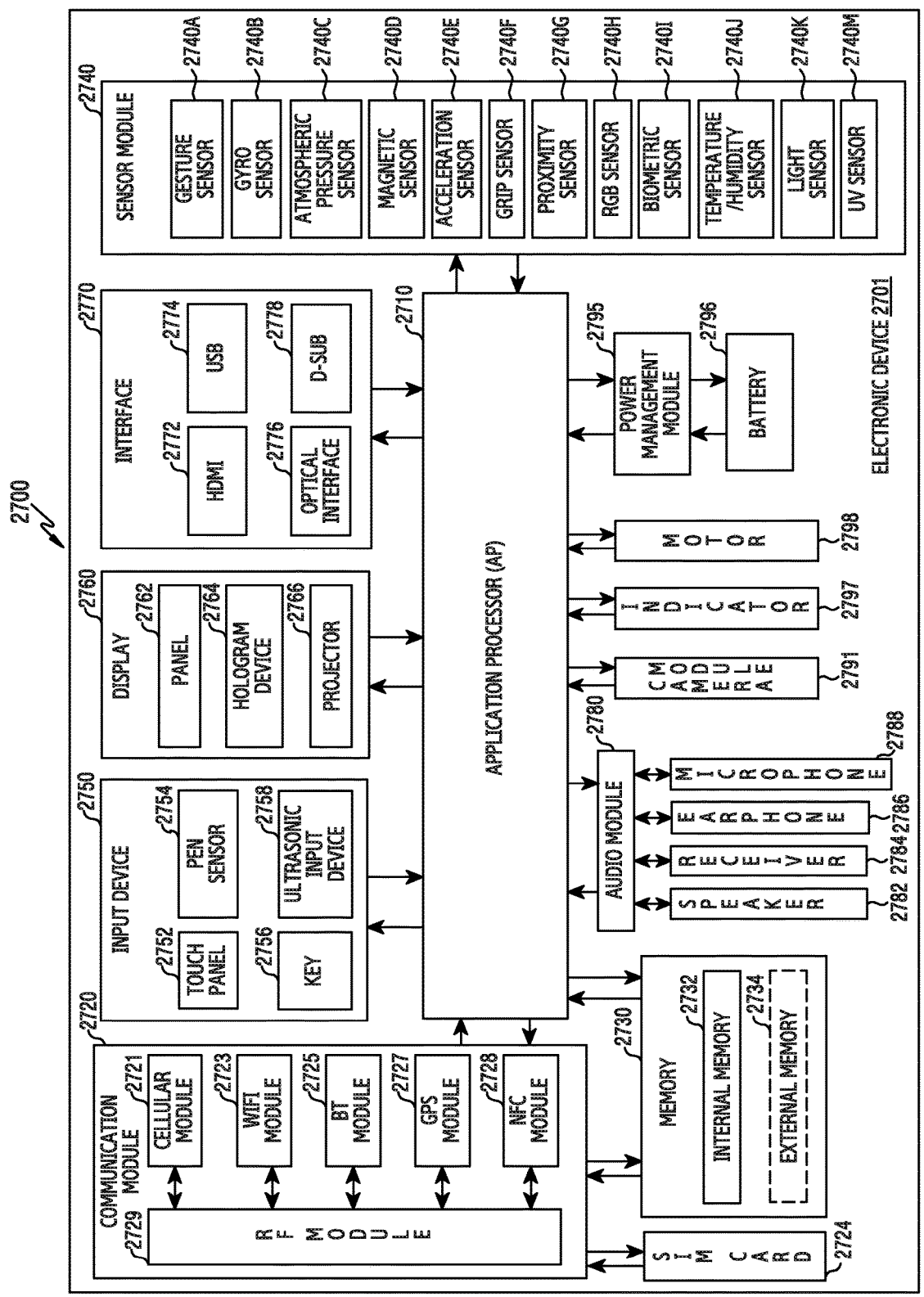
FIG. 27 illustrates another example of the block diagram of the electronic device according to an embodiment of the present invention.

FIG. 27 illustrates another example of the block diagram of the electronic device according to an embodiment of the present invention.

Referring to FIG. 27, the electronic device 2700 may include at least one Application Processor (AP) 2710, a communication module 2720, a Subscriber Identification Module (SIM) card 2724, a memory 2730, a sensor module 2740, an input device 2750, a display 2760, an interface 2770, an audio module 2780, a camera module 2791, a power management module 2795, a battery 2796, an indicator 2797, and a motor 2798.

The AP 2710 may control a plurality of hardware or software components connected thereto by driving an operating system or an application program, process various types of data including multimedia data, and may perform calculations. The AP 2710 may be embodied as, for example, a System on Chip (SoC). According to an embodiment, the AP 2710 may further include a graphic processing unit (GPU) (not shown).

In addition to the typical function, according to an embodiment of the present invention, when a traffic request is received from at least one other electronic device, the AP 2710 may select at least one network from a plurality of networks according to the traffic characteristic. The plurality of networks may include at least one of a wireless LAN and a cellular network. The traffic characteristic may include at least one of a response time and throughput. The traffic request may include information on the response time or the throughput. The information on the response time or the throughput may be information differently set according to an application executed in the other electronic device. The AP 2710 may select at least one network further based on network status information of each of the plurality of networks. The network status information may include at least one of a response time and throughput previously measured for each of the plurality of networks.

When the traffic is first traffic that does not care if a fast response time or high throughput is not guaranteed, the AP 2710 may select a first network having the highest cost from the plurality of networks. The AP 2170 may identify whether the electronic device is connected to the first network. When the traffic request is generated by a number of times larger than a predetermined number of times and an attempt of the connection to the first network is not successful, the AP 2710 may select a second network. When the traffic is second traffic requiring a fast response, the AP 2710 may select one network that provides the fastest response time among the plurality of networks. When the traffic is third traffic requiring high throughput, the AP 2710 may select one network that provides the highest throughput among the plurality of networks.

The AP 2710 may make a request for a part of the traffic to the server through each of the plurality of networks, receive the requested part of the traffic, and measure a response time or throughput of each of the plurality of networks. When an average response time measured for at least one selected network exceeds a previously measured average response time, the AP 2710 may select at least one network that provides the fastest response time again from the plurality of networks. When a traffic request is received from an electronic device receiving a priority among at least one other electronic device, the AP 2710 may select two or more networks from the plurality of networks. When data throughput between the electronic device and the other electronic device receiving the priority is larger than data throughput between the electronic device and the server, the AP 2710 may select two or more networks. The priority may be set by the user.

The AP 2710 according to another embodiment of the present invention may determine a characteristic of the traffic for which a request is made to the server. The AP 2710 may determine the traffic characteristic based on an application execution mode. The AP 2710 may generate the traffic request including information on the traffic characteristic. The application execution mode may include at least one of a background mode, a web browsing mode, and a file download mode. The traffic may include at least one of first traffic that does not care if a fast response time or high throughput is not guaranteed, second traffic requiring a fast response time, and third traffic requiring high throughput.

The communication module 2720 may transmit and receive data in communication between different electronic devices connected to the electronic device 2700 through the network. According to an embodiment, the communication module 2720 may include a cellular module 2721, a Wi-Fi module 2723, a BT module 2725, a GPS module 2727, an NFC module 2728, and a radio frequency (RF) module 2729.

The cellular module 2721 may provide a voice call, a video call, a text message service, an Internet service, or the like through a communication network (for example, LTE, LTE-A, CDMA, WCDMA, UMTS, WiBro, GSM, or the like). Also, the cellular module 2721 may identify and authenticate an electronic device in a communication network using, for example, a subscriber identification module (for example, the SIM card 2724). According to an embodiment, the cellular module 2721 may perform at least some of the functions that the AP 2710 may provide. For example, the cellular module 2721 may perform at least a part of the multimedia control function.

According to an embodiment, the cellular module 2721 may include a communication processor (CP). Furthermore, the cellular module 2721 may be implemented by, for example, an SoC. Although the elements, such as the cellular module 2721 (for example, the communication processor), the memory 2730, and the power management module 2795, are illustrated to be separate from the AP 2710 in FIG. 21, the AP 2710 may be implemented to include at least some of the above described elements (for example, the cellular module 2721) according to one embodiment.

According to an embodiment, the AP 2710 or the cellular module 2721 (for example, a communication processor) may load, into a volatile memory, a command or data received from at least one of a non-volatile memory and other components connected thereto, and may process the loaded command Furthermore, the AP 2710 or the cellular module 2721 may store, in a non-volatile memory, data received from or generated by at least one of the other component elements.

Each of the Wi-Fi module 2723, the BT module 2725, the GPS module 2727, and the NFC module 2728 may include, for example, a processor for processing data transmitted/received through the corresponding module. Although each of the cellular module 2721, the Wi-Fi module 2723, the BT module 2725, the GPS module 2727, and the NFC module 2728 is illustrated as a separate block in FIG. 27, at least some (for example, two or more) of the cellular module 2721, the Wi-Fi module 2723, the BT module 2725, the GPS module 2727, and the NFC module 2728 may be included in one integrated chip (IC) or IC package according to an embodiment. For example, at least some (for example, the communication processor corresponding to the cellular module 2721 and the Wi-Fi processor corresponding to the Wi-Fi module 2723) of processors corresponding to the cellular module 2721, the Wi-Fi module 2723, the BT module 2725, the GPS module 2727, and the NFC module 2728 may be implemented as one SoC.

The RF module 2729 may transmit/receive data, for example, an RF signal. Although not illustrated, the RF module 2729 may, for example, include a transceiver, a power amp module (PAM), a frequency filter, a low noise amplifier (LNA), or the like. Furthermore, the RF module 2729 may further include a component for transmitting/receiving electronic waves over a free air space in wireless communication, for example, a conductor, a conducting wire or the like. Although the cellular module 2721, the Wi-Fi module 2723, the BT module 2725, the GPS module 2727, and the NFC module 2728 are illustrated to share one RF module 2729 in FIG. 27, at least one of the cellular module 2721, the Wi-Fi module 2723, the BT module 2725, the GPS module 2727, and the NFC module 2728 may transmit/ receive the RF signal through a separate RF module according to an embodiment.

In addition to the typical function, the communication module 2720 according to an embodiment of the present invention may receive traffic from the server through the selected network. When the electronic device is connected to a first network, the communication module 2720 may receive the traffic from the server through the first network. When the electronic device is not connected to the first network, the communication module 2720 may attempt the connection to the first network and, when the attempt of the connection is successful, may receive the traffic from the server through the first network. When the attempt of the connection is not successful, the communication module 2720 may transmit an error message to at least one other electronic device. When a size of the traffic received from the server is larger than a predetermined threshold value, the communication module 2720 may partitively receive parts of the traffic through the plurality of networks, respectively. The communication module 2720 may receive the remaining parts of the traffic through a network having the highest average throughput for the partitively received parts of the traffic among the plurality of networks.

The communication module 2720 according to another embodiment of the present invention may transmit the traffic request including the information on the traffic characteristic to another electronic device. The communication module 2720 may receive the traffic from the server through the other electronic device.

The SIM card 2724 may be a card including a subscriber identification module and may be inserted into a slot formed in a particular portion of the electronic device. The SIM card 2724 may include unique identification information (for example, an Integrated Circuit Card IDentifier (ICCID)) or subscriber information (for example, an International Mobile Subscriber IDentity (IMSI)).

The memory 2730 may include an internal memory 2732 or an external memory 2734. The internal memory 2732 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment, the internal memory 2732 may be a solid state drive (SSD). The external memory 2734 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 2734 may be functionally connected to the electronic device 2700 through various interfaces. According to an embodiment, the electronic device 2700 may further include a storage device (or storage medium) such as a hard drive. The memory 2730 stores micro codes of a program for processing and a control of the AP 2710 and various types of reference data. Particularly, according to an embodiment of the present invention, the memory 2730 stores micro codes of a program for processing and a control of the AP 2710 and various types of reference data. Particularly, according to an embodiment of the present invention, the memory 2730 may store at least one of a response time and data throughput for each of a plurality networks measured by the electronic device.

The sensor module 2740 may measure a physical quantity or detect an operating state of the electronic device 2700, and may convert the measured or detected information into an electronic signal. The sensor module 2740 may include, for example, at least one of a gesture sensor 2740A, a gyro sensor 2740B, an atmospheric pressure sensor 2740C, a magnetic sensor 2740D, an acceleration sensor 2740E, a grip sensor 2740F, a proximity sensor 2740G, a color sensor 2740H (for example, red, green, and blue (RGB) sensor), a biometric sensor 2740I, a temperature/humidity sensor 2740J, an illumination sensor 2740K, and an Ultra Violet (UV) sensor 2740M. Additionally or alternatively, the sensor module 2740 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor (not illustrated), an iris sensor (not illustrated), a fingerprint sensor (not illustrated), and the like. The sensor module 2740 may further include a control circuit for controlling at least one sensor included therein.

The input device 2750 may include a touch panel 2752, a (digital) pen sensor 2754, a key 2756, or an ultrasonic input device 2758. The touch panel 2752 may recognize a touch input through at least one of, for example, a capacitive type, a resistive type, an infrared type, and an ultrasonic type. The touch panel 2752 may further include a control circuit. In the case of the capacitive type, physical contact or proximity recognition is possible. The touch panel 2752 may further include a tactile layer. In this case, the touch panel 2752 may provide a tactile reaction to a user. The touch panel 2752 according to an embodiment of the present invention may recognize the generation of a touch input.

The (digital) pen sensor 2754 may be implemented, for example, using a method identical or similar to receiving a user's touch input or using a separate recognition sheet. The key 2756 may include, for example, a physical button, an optical key or a keypad. The ultrasonic input device 2758 is a unit that may identify data by generating an ultrasonic signal through an input tool and detecting a sonic wave through a microphone (for example, a microphone 2788) in the electronic device 2700, and is capable of wireless recognition. According to an embodiment, the electronic device 2700 may also receive a user input from an external device (for example, a computer or a server) connected thereto by using the communication module 2720.

The display 2760 may include a panel 2762, a hologram device 2764, or a projector 2766. The panel 2762 may be, for example, a Liquid Crystal Display (LCD), an Active Matrix Organic Light Emitting Diode (AM-OLED), or the like. The panel 2762 may be implemented to be, for example, flexible, transparent, or wearable. The panel 2762 may also be integrated with the touch panel 2752 as a single module. The hologram device 2764 may show a stereoscopic image in the air by using interference of light. The projector 2766 may project light onto a screen to display an image. For example, the screen may be located inside or outside the tethering device 2700. According to an embodiment, the display 2760 may further include a control circuit for controlling the panel 2762, the hologram device 2764, or the projector 2766.

The interface 2770 may include, for example, a High-Definition Multimedia Interface (HDMI) 2772, a Universal Serial Bus (USB) 2774, an optical interface 2776, or a D-subminiature (D-sub) 2778. Additionally or alternatively, the interface 2770 may include, for example, a Mobile High-definition Link (MHL) interface, a Secure Digital (SD) card/Multi-Media Card (MMC) interface, or an Infrared Data Association (IrDA) standard interface.

The audio module 2780 may bilaterally convert a sound and an electrical signal. The audio module 2780 may process voice information input or output through, for example, a speaker 2782, a receiver 2784, earphones 2786, or the microphone 2788.

The camera module 2791 is a device that may photograph a still image and a video. According to an embodiment of the present invention, the camera module 2791 may include one or more image sensors (for example, a front sensor or a rear sensor), a lens (not illustrated), an Image Signal Processor (ISP) (not illustrated) or a flash (not illustrated) (for example, an LED or xenon lamp).

The power management module 2795 may manage electric power of the electronic device 2700. Although not illustrated, the power management module 2795 may include, for example, a Power Management Integrated Circuit (PMIC), a charger Integrated Circuit (IC), or a battery or fuel gauge.

The PMIC may be mounted, for example, in integrated circuits or SoC semiconductors. The charging methods may be classified into wired charging and wireless charging. The charger IC may charge a battery and prevent inflow of excessive voltage or excessive current from a charger. According to an embodiment, the charger IC may include a charger IC for at least one of the wired charging and the wireless charging. Examples of the wireless charging may include magnetic resonance charging, magnetic induction charging, and electromagnetic charging, and an additional circuit, such as a coil loop, a resonance circuit, a rectifier or the like, may be added for the wireless charging.

The battery fuel gauge may measure, for example, the remaining amount of battery 2796 or a voltage, current, or temperature during charging. The battery 2796 may store or generate electricity and supply power to the electronic device 2700 using the stored or generated electricity. The battery 2796 may include, for example, a rechargeable battery or a solar battery.

The indicator 2797 may show particular statuses of the electronic device 2700 or a part (for example, AP 2710) of the electronic device 2700, for example, a boot-up status, a message status, a charging status and the like. The motor 2798 may convert an electrical signal into mechanical vibration. Although not illustrated, the electronic device 2700 may include a processing device (for example, a GPU) for supporting a mobile TV. The processing device for supporting the mobile TV may process media data according to standards, for example, a digital multimedia broadcasting (DMB), a digital video broadcasting (DVB), a media flow, or the like.

The above described components of the tethering device according to various embodiments of the present invention may be formed of one or more components, and a name of a corresponding component element may be changed based on the type of electronic device. The tethering device according to the present invention may include one or more of the aforementioned components or may further include other additional components, or some of the aforementioned components may be omitted. Further, some of the components of the tethering device according to the various embodiments of the present invention may be combined to form a single entity, and thus, may equivalently execute functions of the corresponding elements prior to the combination.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present invention as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present invention, a component included in the present invention is expressed in the singular or the plural according to a presented detailed embodiment. However, the singular or plural expressions are selected to be suitable for proposed situations for convenience of description, and the present invention is not limited to the singular or plural elements. An element expressed in a plural form may be configured in singular, or an element expressed in a singular form may be configured in plural.

Although specific exemplary embodiments have been described in the detailed description of the present invention, various change and modifications may be made without departing from the spirit and scope of the present invention. Therefore, the scope of the present invention should not be defined as being limited to the embodiments, but should be defined by the appended claims and equivalents thereof.

The invention claimed is:

1. A first electronic device comprising:
a transceiver; and
at least one processor configured to:
receive, from a second electronic device, a message for requesting a traffic to a server, through a connection between the first electronic device and the second electronic device, wherein the message comprises control information for indicating a traffic characteristic,
identify at least one network among a plurality of networks based on measurement values for the traffic characteristic for each of the plurality of networks,
transmit, to the server, the message through the identified at least one network,
receive data from the server in response to the message, through the identified at least one network, and transmit, to the second electronic device, the data through the connection,
wherein the traffic characteristic comprises at least one of a response time or throughput required by an application corresponding to the traffic,
wherein the connection comprises a tethering connection, and
wherein the tethering connection comprises a short-range communication network different from the identified at least one network.

2. The first electronic device of claim 1,
wherein the traffic characteristic is a metric related to a performance of each of the plurality of networks required by the second electronic device, and
wherein the measurement values for each of the plurality of networks comprises at least one of a response time or throughput for each of the plurality of networks.

3. The first electronic device of claim 1, wherein the at least one processor is further configured to:
determine whether the first electronic device is connected to the identified at least one network,
receive the data from the server through the identified at least one network, if the first electronic device is connected to the identified at least one network,
attempt to connect to the identified at least one network, if the first electronic device is not connected to the identified at least one network,
receive the data from the server through the identified at least one network, if the attempt to connect is successful, and
transmit an error message to the second electronic device, if the attempt to connect is not successful.

4. The first electronic device of claim 3, wherein, if a number of attempts to connect to the identified at least one network is larger than a predetermined number of times and no attempt to connect to the identified at least one network is successful, the at least one processor is further configured to identify another network from the plurality of networks.

5. The first electronic device of claim 1, wherein, in order to identify the at least one network from the plurality of networks based on the measurement values for the traffic characteristic for the each of the plurality of networks, the at least one processor is further configured to:
receive, from the server, a plurality of response messages for the message through the plurality of networks,
measure a plurality of response times based on receiving of the plurality of response messages, and
obtain the measurement values corresponding to averages of each of the plurality of response times for the each of the plurality of networks.

6. The first electronic device of claim 5, wherein, if a response time measured for the identified at least one network exceeds the averages of each of the plurality of response times, the at least one processor is further configured to identify at least one network from the plurality of networks based on measurement values for each of the plurality of networks.

7. The first electronic device of claim 1, wherein, if a size of the traffic to be received from the server is larger than a predetermined threshold value, the at least one processor is further configured to:
receive a plurality of parts of the traffic through the plurality of networks, respectively,
measure a plurality of throughputs for each of the plurality of part of the traffic, and
obtain the measurement values corresponding to averages of each of the plurality of throughputs for each of the plurality of networks.

8. The first electronic device of claim 1,
wherein the at least one processor is further configured to:
compare first throughput with second throughput, and
if the first throughput is larger than the second throughput, identify at least two networks from the plurality of networks,
wherein the first throughput is obtained based on data from the first electronic device to the second electronic device, and
wherein the second throughput is obtained based on data from the server to the first electronic device.

9. A second electronic device comprising:
a transceiver; and
at least one processor configured to:
identify a traffic characteristic for a traffic,
transmit, to a first electronic device, a message for requesting the traffic to a server, through a connection between the first electronic device and the second electronic device, wherein the message comprises control information for indicating the traffic characteristic, and
receive data from the first electronic device, through the connection,
wherein at least one network is identified among a plurality of networks based on measurement values for the traffic characteristic for each of the plurality of networks,
wherein the traffic characteristic comprises at least one of a response time or throughput required by an application corresponding to the traffic,
wherein the message is transmitted to the server through the identified at least one network, and
wherein the data is received in response to the message from the server through the identified at least one network.

10. The second electronic device of claim 9, wherein the at least one processor is further configured to:
identify the traffic characteristic based on an application execution mode.

11. The second electronic device of claim 10,
wherein the application execution mode comprises at least one of a background mode, a web browsing mode, or a file download mode, and
wherein the traffic characteristic comprises at least one of a response time and throughput.

12. The second electronic device of claim 9,
wherein, in order to transmit, to the first electronic device, the message for requesting the traffic to the server, the at least one processor is further configured to identify that the traffic corresponds to traffic required to be secured, and
wherein the at least one processor is further configured to transmit, to a wireless local area network (LAN) access point, a message for requesting the traffic to the server, based on identifying that the traffic corresponds to traffic which is not required to be secured.

13. A method performed by a first electronic device, the method comprising:
receiving, from a second electronic device, a message for requesting a traffic to a server, through a connection between the first electronic device and the second electronic device, wherein the message comprises control information for indicating a traffic characteristic;

identifying at least one network among a plurality of networks based on measurement values for the traffic characteristic for each of the plurality of networks;

transmitting, to the server, the message through the identified at least one network;

receiving data from the server in response to the message, through the identified at least one network; and transmitting, to the second electronic device, the data through the connection, wherein the traffic characteristic comprises at least one of a response time or throughput required by an application corresponding to the traffic, wherein the connection comprises a tethering connection, and wherein the tethering connection comprises a short-range communication network different from the identified at least one network.

14. The method of claim 13, wherein the traffic characteristic is a metric related to a performance of each of the plurality of networks required by the second electronic device, and wherein the measurement values for each of the plurality of networks comprise at least one of a response time or throughput for each of the plurality of networks.

15. The method of claim 13, further comprising:

determining whether the first electronic device is connected to the identified at least one network;

receiving the data from the server through the identified at least one network, if the first electronic device is connected to the identified at least one network;

attempting to connect to the identified at least one network, if the first electronic device is not connected to the identified at least one network;

receiving the data from the server through the identified at least one network, if the attempt to connect is successful; and transmitting an error message to the second electronic device, if the attempt to connect is not successful.

16. The method of claim 15, further comprising:

if a number of attempts to connect to the identified at least one network is larger than a predetermined number of times and no attempt to connect to the identified at least one network is successful, identifying another network from the plurality of networks.

17. The method of claim 13, wherein the identifying the at least one network from the plurality of networks based on the measurement values for the traffic characteristic for the each of the plurality of networks comprises:

receiving, from the server, a plurality of response messages for the message through the plurality of networks;

measuring a plurality of response times based on receiving of the plurality of response messages; and obtaining the measurement values corresponding to averages of each of the plurality of response times for the each of the plurality of networks.

18. The method of claim 17, further comprising:

if a response time measured for the identified at least one network exceeds the averages of each of the plurality of response times, identifying at least one network from the plurality of networks based on measurement values for each of the plurality of networks.

19. The method of claim 13, further comprising:

if a size of the traffic to be received from the server is larger than a predetermined threshold value, receiving a plurality of parts of the traffic through the plurality of networks, respectively;

measuring a plurality of throughputs for each of the plurality of part of the traffic; and obtaining the measurement values corresponding to averages of each of the plurality of throughputs for each of the plurality of networks.

20. The method of claim 13, wherein the identifying the at least one network from the plurality of networks comprises:

comparing first throughput with second throughput; and if the first throughput is larger than the second throughput, identifying at least two networks from the plurality of networks, wherein the first throughput is obtained based on data from the first electronic device to the second electronic device, and wherein the second throughput is obtained based on data from the server to the first electronic device.

* * * * *